United States Patent
Onishi

(10) Patent No.: US 10,771,940 B2
(45) Date of Patent: Sep. 8, 2020

(54) IN-VEHICLE DEVICE, INFORMATION PROCESSING METHOD AND COMPUTER-READABLE MEDIUM

(71) Applicant: TOYOTA JIDOSHA KABUSHIKI KAISHA, Toyota-shi, Aichi-ken (JP)

(72) Inventor: Ryokichi Onishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/427,929

(22) Filed: May 31, 2019

(65) Prior Publication Data
US 2019/0380014 A1     Dec. 12, 2019

(30) Foreign Application Priority Data
Jun. 7, 2018 (JP) .................................. 2018-109513

(51) Int. Cl.
*H04W 4/46*     (2018.01)
*H04W 4/44*     (2018.01)
*G08G 1/01*     (2006.01)

(52) U.S. Cl.
CPC ............ *H04W 4/46* (2018.02); *G08G 1/0112* (2013.01); *H04W 4/44* (2018.02)

(58) Field of Classification Search
CPC ......... H04W 4/46; H04W 4/44; G08G 1/0112
USPC ....................................... 455/517, 99, 569.2
See application file for complete search history.

(56) References Cited

U.S. PATENT DOCUMENTS

| | | | |
|---|---|---|---|
| 5,933,100 A * | 8/1999 | Golding | G01C 21/3492 340/988 |
| 6,711,493 B1 * | 3/2004 | Andrews | G08G 1/0104 340/903 |
| 6,900,740 B2 * | 5/2005 | Bloomquist | G08G 1/096716 340/905 |
| 7,366,606 B2 * | 4/2008 | Uyeki | G01C 21/26 340/933 |

(Continued)

FOREIGN PATENT DOCUMENTS

| | | |
|---|---|---|
| JP | 2005-521950 A | 7/2005 |
| JP | 2007-248425 A | 9/2007 |

(Continued)

*Primary Examiner* — Hai V Nguyen
(74) *Attorney, Agent, or Firm* — Oliff PLC

(57) ABSTRACT

An in-vehicle device includes: a first communicator for inter-vehicle communication; a second communicator for communication with a predetermined transmission destination; and a storage configured to store first information pieces and a list including respective identification information pieces of the first information pieces; and a controller. The controller exchanges lists with a first in-vehicle device through the first communicator, and at a predetermined timing for transmitting the first information pieces stored in the storage to the predetermined transmission destination through the second communicator, when a predetermined condition is met, the controller does not transmit a first information piece included in the first information pieces and provided with an identification information piece included in both the list stored in the storage and a first list received from the first in-vehicle device and including respective identification information pieces of first information pieces each held by any of the other in-vehicle devices.

18 Claims, 13 Drawing Sheets

(56) References Cited

U.S. PATENT DOCUMENTS

| | | | | |
|---|---|---|---|---|
| 7,596,618 B2* | 9/2009 | Basu | H04L 45/46 | 455/453 |
| 7,636,325 B2* | 12/2009 | Basu | H04L 45/02 | 370/254 |
| 7,684,352 B2* | 3/2010 | Smith | H04L 45/02 | 370/255 |
| 7,734,751 B2* | 6/2010 | Donescu | H04L 63/104 | 709/223 |
| 8,050,855 B2* | 11/2011 | Coy | G08G 1/0104 | 340/905 |
| 8,229,663 B2* | 7/2012 | Zeng | G08G 1/163 | 701/301 |
| 8,233,389 B2* | 7/2012 | Yim | H04L 47/14 | 370/229 |
| 8,897,806 B2* | 11/2014 | Wakikawa | G08G 1/0112 | 455/456.1 |
| 8,922,391 B2* | 12/2014 | Rubin | H04W 74/0816 | 340/903 |
| 8,924,460 B2* | 12/2014 | Collet | H04L 67/104 | 709/202 |
| 8,954,205 B2* | 2/2015 | Sagar | G08G 1/164 | 701/1 |
| 8,965,677 B2* | 2/2015 | Breed | G01S 19/42 | 701/301 |
| 9,036,509 B1* | 5/2015 | Addepalli | H04L 43/0876 | 370/259 |
| 9,129,532 B2* | 9/2015 | Rubin | G08G 1/166 | |
| 9,245,446 B2* | 1/2016 | Chen | G08G 1/163 | |
| 9,253,753 B2* | 2/2016 | Rubin | H04W 4/12 | |
| 9,300,423 B2* | 3/2016 | Rubin | H04J 3/1694 | |
| 9,704,396 B1* | 7/2017 | Owens | G08G 1/0965 | |
| 9,729,636 B2* | 8/2017 | Koravadi | G08G 1/02 | |
| 9,731,645 B1* | 8/2017 | Taleb-Bendiab | G08G 1/096716 | |
| 9,788,350 B2* | 10/2017 | Park | H04W 76/10 | |
| 9,792,821 B1* | 10/2017 | Yalla | G08G 1/167 | |
| 9,843,500 B2* | 12/2017 | Chia | H04L 43/062 | |
| 10,002,394 B1* | 6/2018 | Owens | G08G 1/0965 | |
| 10,051,061 B2* | 8/2018 | Koravadi | G05D 1/0022 | |
| 10,117,240 B2* | 10/2018 | Blasco Serrano | H04L 67/12 | |
| 10,140,784 B1* | 11/2018 | Philosof | G07C 5/008 | |
| 10,205,670 B2* | 2/2019 | Tan | H04W 40/20 | |
| 10,306,580 B1* | 5/2019 | Gupta | H04W 36/0033 | |
| 10,390,195 B2* | 8/2019 | Kim | H04W 4/46 | |
| 10,467,907 B2* | 11/2019 | Pilkington | B62D 15/025 | |
| 2003/0154193 A1 | 8/2003 | Rosenblum | | |
| 2007/0100537 A1* | 5/2007 | Parikh | G08G 1/167 | 701/117 |
| 2007/0112503 A1* | 5/2007 | Johnson | G08G 1/20 | 701/117 |
| 2008/0062901 A1* | 3/2008 | Kadowaki | H04L 1/00 | 370/310 |
| 2010/0036595 A1* | 2/2010 | Coy | G08G 1/0104 | 701/119 |
| 2010/0161752 A1* | 6/2010 | Collet | H04L 67/104 | 709/216 |
| 2010/0198513 A1* | 8/2010 | Zeng | G01S 5/0072 | 701/300 |
| 2011/0238259 A1* | 9/2011 | Bai | H04L 67/125 | 701/31.4 |
| 2012/0108163 A1* | 5/2012 | Bai | H04W 4/06 | 455/3.06 |
| 2012/0327840 A1* | 12/2012 | Chen | H04L 45/54 | 370/315 |
| 2013/0258878 A1* | 10/2013 | Wakikawa | G08G 1/096758 | 370/252 |
| 2013/0279392 A1* | 10/2013 | Rubin | H04W 72/005 | 370/312 |
| 2013/0279393 A1* | 10/2013 | Rubin | H04L 67/12 | 370/312 |
| 2013/0279491 A1* | 10/2013 | Rubin | H04W 76/50 | 370/347 |
| 2014/0105033 A1* | 4/2014 | Vasseur | H04L 45/24 | 370/248 |
| 2014/0323049 A1* | 10/2014 | Park | H04W 76/10 | 455/41.2 |
| 2014/0358324 A1* | 12/2014 | Sagar | G08G 1/164 | 701/1 |
| 2016/0036917 A1* | 2/2016 | Koravadi | G08G 1/096708 | 701/2 |
| 2016/0080279 A1* | 3/2016 | Tan | H04W 4/80 | 370/328 |
| 2016/0360524 A1* | 12/2016 | Blasco Serrano | H04W 72/0446 | |
| 2017/0158133 A1* | 6/2017 | Chundrlik, Jr. | B60R 1/00 | |
| 2017/0222913 A1* | 8/2017 | Chia | G08G 1/09675 | |
| 2017/0278402 A1* | 9/2017 | Yalla | G01C 21/3602 | |
| 2017/0287233 A1* | 10/2017 | Nix | G08G 1/166 | |
| 2017/0337813 A1* | 11/2017 | Taylor | G05D 1/0287 | |
| 2017/0366614 A1* | 12/2017 | Koravadi | G08G 1/02 | |
| 2018/0092017 A1* | 3/2018 | Freda | H04B 7/155 | |
| 2018/0114441 A1* | 4/2018 | Marmet | H04W 4/024 | |
| 2018/0150086 A1* | 5/2018 | Nobukawa | G01C 21/12 | |
| 2018/0159935 A1* | 6/2018 | Cavalcanti | H04W 4/40 | |
| 2018/0234895 A1* | 8/2018 | Shin | H04W 4/46 | |
| 2018/0310147 A1* | 10/2018 | Kim | H04W 4/40 | |
| 2018/0359067 A1* | 12/2018 | Kim | H04W 72/0446 | |
| 2018/0367615 A1* | 12/2018 | Koravadi | G05D 1/0022 | |
| 2019/0011925 A1* | 1/2019 | Bansal | G08G 1/096708 | |
| 2019/0026796 A1* | 1/2019 | Dinis da Silva de Carvalho | G06Q 50/30 | |
| 2019/0029002 A1* | 1/2019 | Kotzer | H04L 67/12 | |
| 2019/0037592 A1* | 1/2019 | Jung | H04W 28/0278 | |
| 2019/0039545 A1* | 2/2019 | Kumar | G07C 5/008 | |
| 2019/0045244 A1* | 2/2019 | Balakrishnan | H04N 21/23605 | |
| 2019/0116518 A1* | 4/2019 | Stojanovski | H04W 28/0257 | |
| 2019/0130739 A1* | 5/2019 | Khedkar | G08G 1/096827 | |
| 2019/0149365 A1* | 5/2019 | Chatterjee | H04L 25/0226 | 370/329 |
| 2019/0150224 A1* | 5/2019 | Han | H04W 88/085 | 370/329 |
| 2019/0159157 A1* | 5/2019 | Gupta | H04W 8/02 | |
| 2019/0174344 A1* | 6/2019 | Karella | H04W 24/10 | |
| 2019/0174449 A1* | 6/2019 | Shan | H04W 60/04 | |
| 2019/0174466 A1* | 6/2019 | Zhang | H04L 5/005 | |
| 2019/0174547 A1* | 6/2019 | Khoryaev | H04W 74/0816 | |
| 2019/0204853 A1* | 7/2019 | Miller, Jr. | H04W 4/46 | |
| 2019/0206260 A1* | 7/2019 | Pilkington | B60W 30/165 | |
| 2019/0215729 A1* | 7/2019 | Oyman | H04L 65/80 | |
| 2019/0222324 A1* | 7/2019 | Kobayashi | H04L 13/08 | |
| 2019/0230522 A1* | 7/2019 | Sugaya | H04W 72/0473 | |
| 2019/0239112 A1* | 8/2019 | Rao | H04W 72/0406 | |
| 2019/0268447 A1* | 8/2019 | Yang | H04L 67/18 | |
| 2019/0313224 A1* | 10/2019 | Yu | H04L 67/12 | |
| 2019/0342731 A1* | 11/2019 | Krishnamoorthy | G06F 16/27 | |
| 2019/0342851 A1* | 11/2019 | Shan | H04W 60/00 | |
| 2019/0349713 A1* | 11/2019 | Obara | H04W 4/029 | |
| 2019/0373511 A1* | 12/2019 | Oyman | H04W 76/28 | |

FOREIGN PATENT DOCUMENTS

| | | |
|---|---|---|
| JP | 2008-242805 A | 10/2008 |
| JP | 2010-136157 A | 6/2010 |

* cited by examiner

FIG. 2
(1) 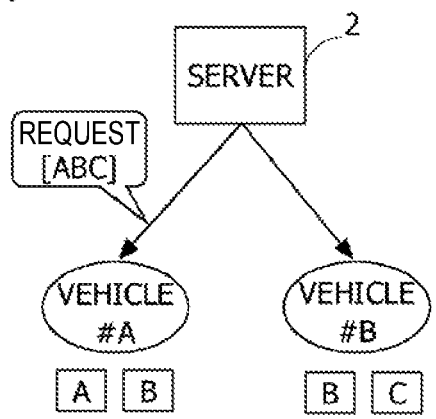
(2) 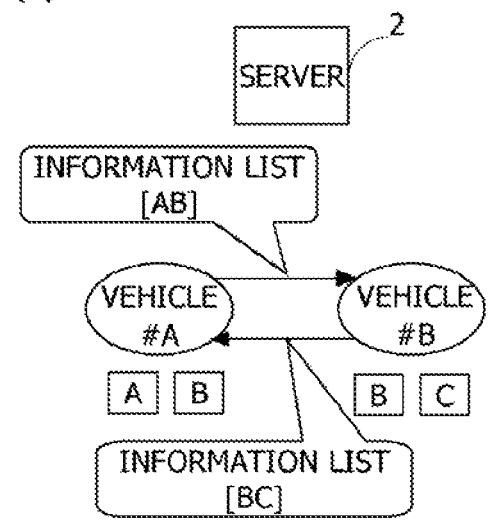
(3) 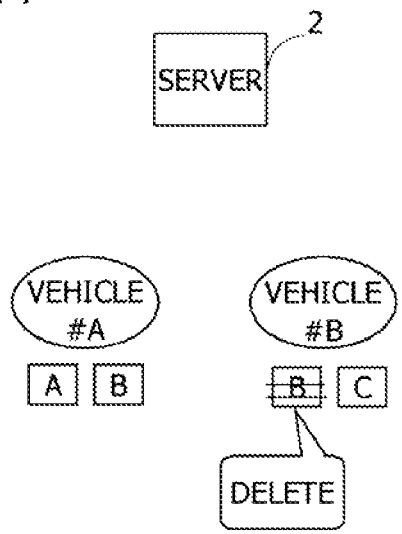
(4) 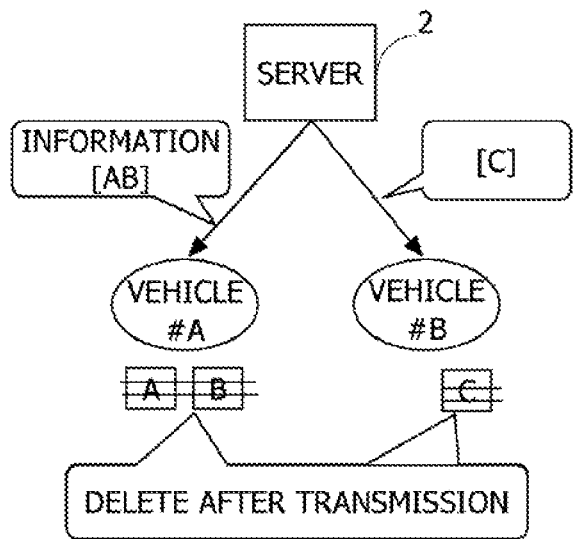

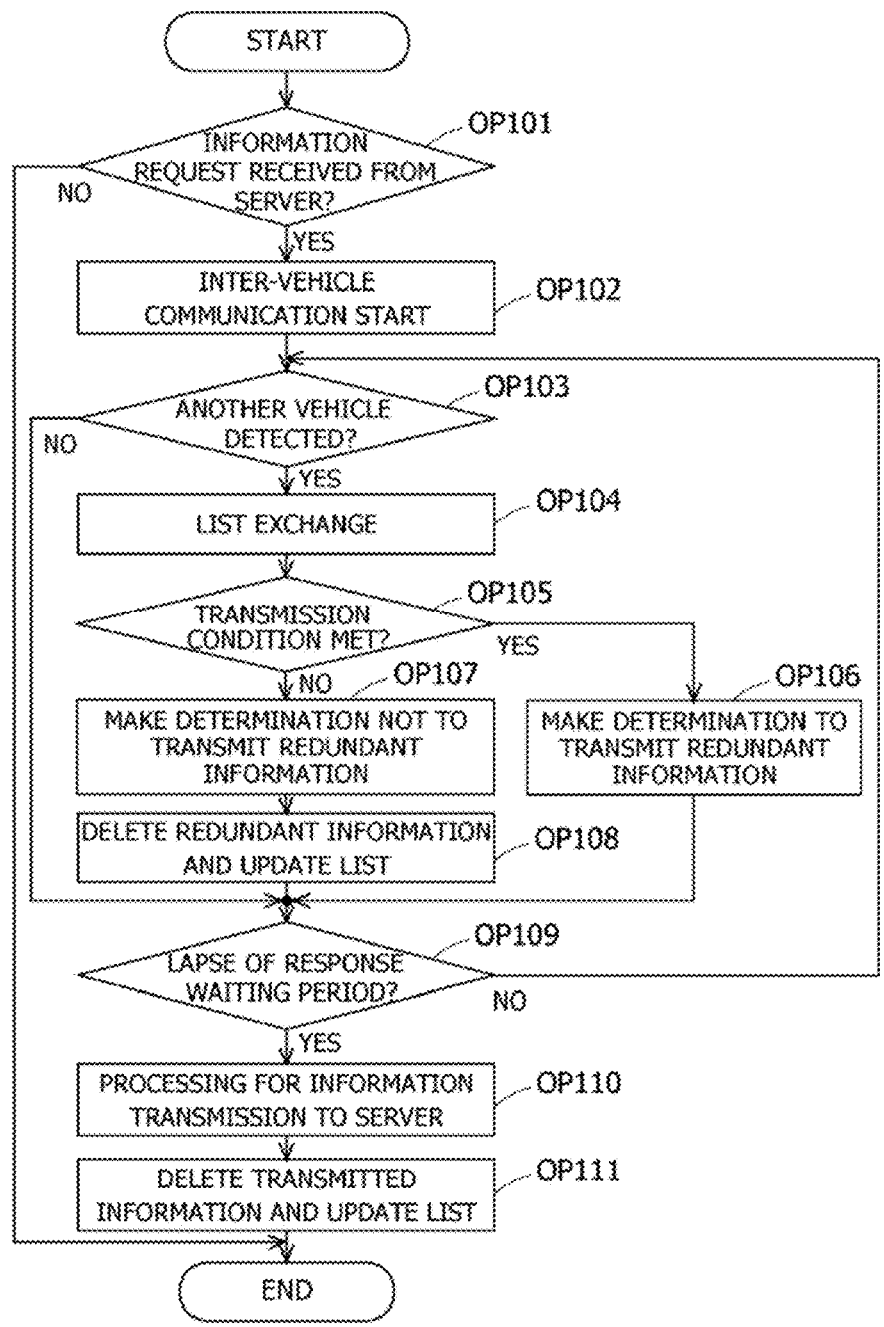

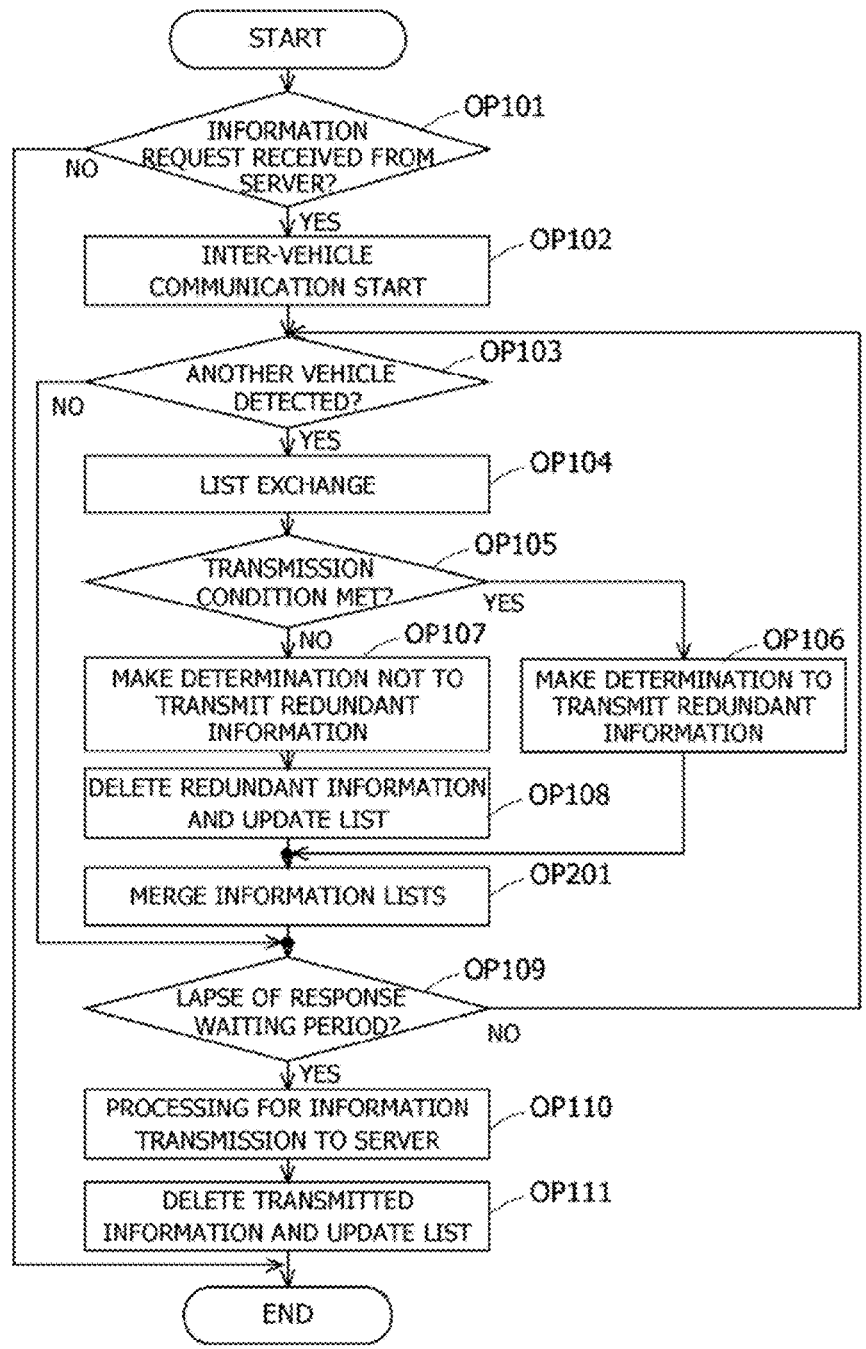

FIG.7B
(5) 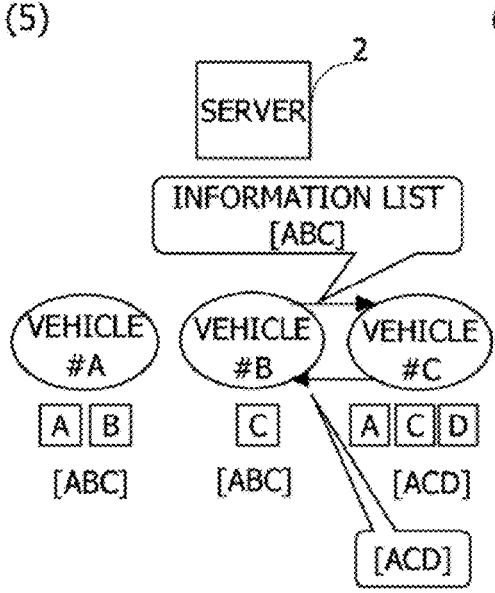
(6) 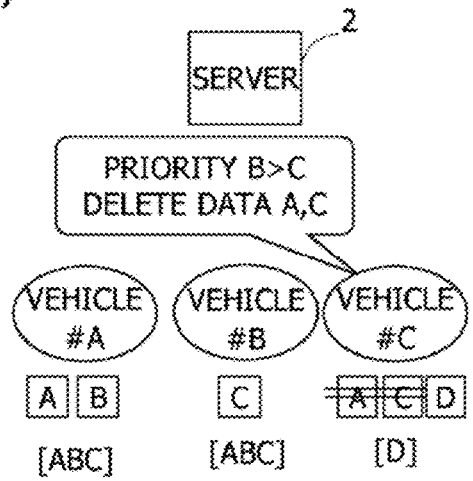
(7) 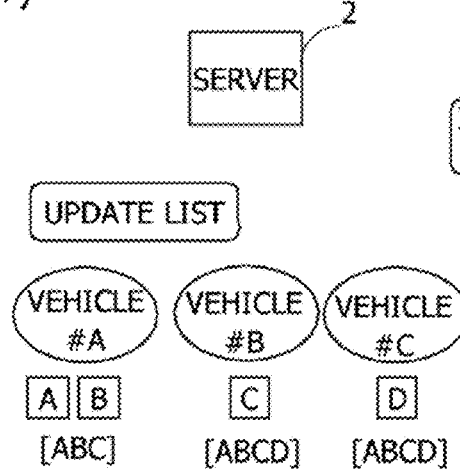
(8) 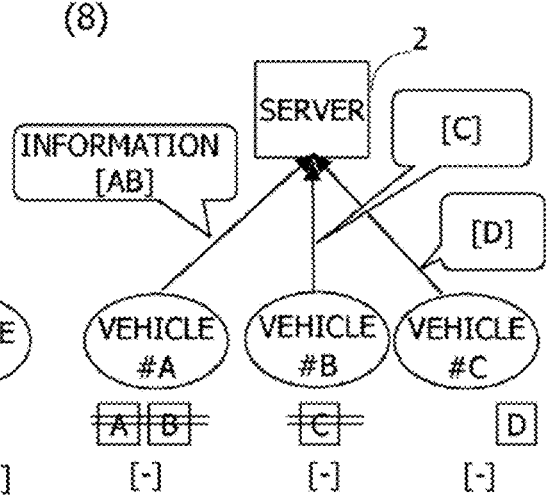

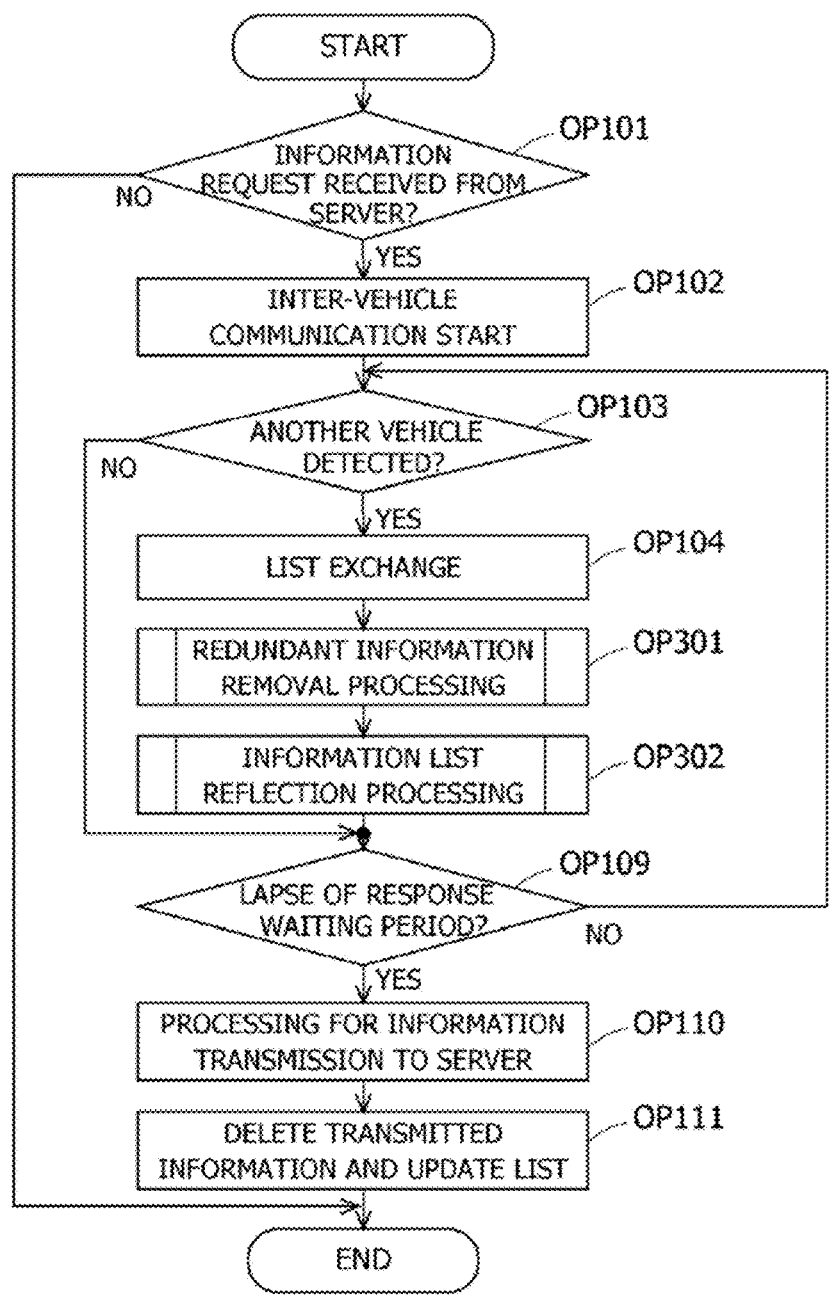

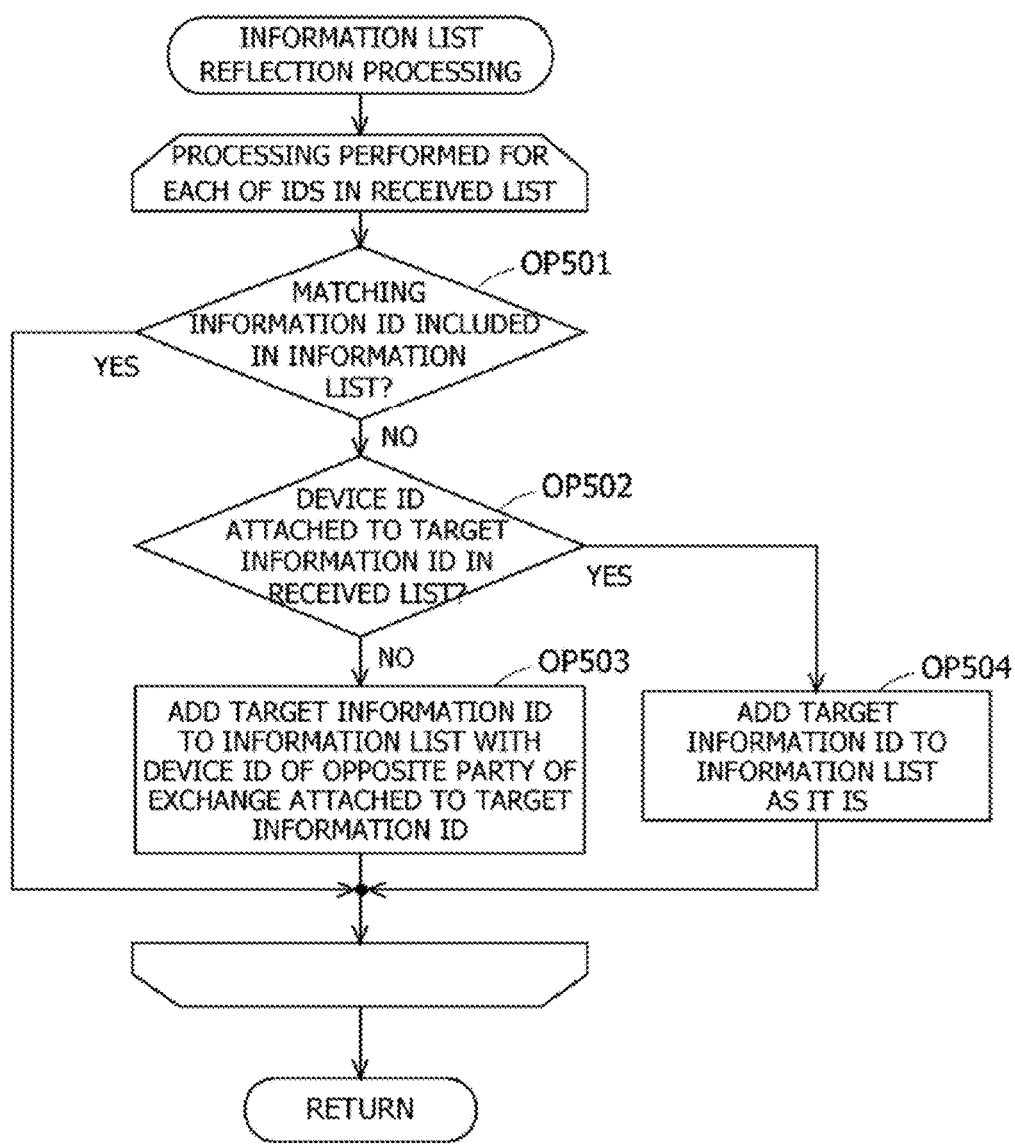

IN-VEHICLE DEVICE, INFORMATION PROCESSING METHOD AND COMPUTER-READABLE MEDIUM

CROSS-REFERENCE TO RELATED APPLICATION

This application claims the benefit of Japanese Patent Application No. 2018-109513, filed on Jun. 7, 2018, which is hereby incorporated by reference herein in its entirety.

BACKGROUND

Technical Field

The present disclosure relates to an in-vehicle device, an information processing method and a computer-readable medium recorded with an information processing program.

Description of the Related Art

In recent years, research for collecting data from running vehicles and utilizing the data has been conducted. For example, collecting current position and speed information from a plurality of vehicles enables generating traffic jam information in real time. Besides, analyzing the data collected from the vehicles from various perspectives enables smoothing the traffic.

CITATION LIST

Patent Document

Patent document 1: Japanese Patent Laid-open No. 2008-242805
Patent document 2: Japanese Patent Application Domestic Laid-Open Publication No. 2005-521950
Patent document 3: Japanese Patent Laid-Open No. 2010-136157

However, when data acquired by a plurality of vehicles are intended to be collected, redundancy of data becomes a problem. For example, as the number of vehicles subject to data collection increases, the amount of redundant, data increases, which may cause a processing burden to be imposed on a server that collects the data. Here, redundant data or information (pieces) in the present description include not only identical data or information (pieces), but also similar information (pieces).

An object of the present disclosure is to provide an in-vehicle device, an information processing method and a computer-readable medium recorded with an information processing program that enable suppression of transmission of redundant information to a predetermined transmission destination.

SUMMARY

One of aspects of the present disclosure provides an in-vehicle device. The in-vehicle device includes:
a first communicator used for communication with other in-vehicle devices;
a second communicator used for communication with a predetermined transmission destination;
a storage configured to store a plurality of information pieces and a list including identification information pieces for identifying the plurality of information pieces, respectively; and
a controller configured to perform transmission processing for transmitting at least a part of the plurality of information pieces stored in the storage to the predetermined transmission destination, wherein
the controller is configured to transmit the list to a first in-vehicle device of the other in-vehicle devices and receive, from the first in-vehicle device through the first communicator, a first list including respective identification information pieces of information pieces each held by any of the other in-vehicle devices including the first in-vehicle device and
when a first information piece is present in the storage, the controller is configured to determine whether or not to transmit the first information piece in the transmission processing depending on whether or not a predetermined condition is met, wherein an identification information piece of the first information piece is included in both the first list and the list.

The present disclosure enables suppression of transmission of redundant information to a predetermined transmission destination.

BRIEF DESCRIPTION OF DRAWINGS

FIG. 2 is a diagram illustrating an example of information collection processing in the data collection system according to the first embodiment;
FIG. 5 is an example of a flowchart of processing in the control unit of the data communication device according to the first embodiment;
FIG. 6 is an example of a flowchart of processing in B control unit of a data communication device according to the first modification;
FIG. 7B is a diagram illustrating an example of information collection processing in a data collection system according to the first modification;
FIG. 8 is an example of a flowchart of processing in the control unit of the data communication device according to the second modification;
FIG. 10 is an example of a flowchart of the information list reflection processing in the control unit according to the second modification.

DESCRIPTION OF THE EMBODIMENTS

Figure 1:
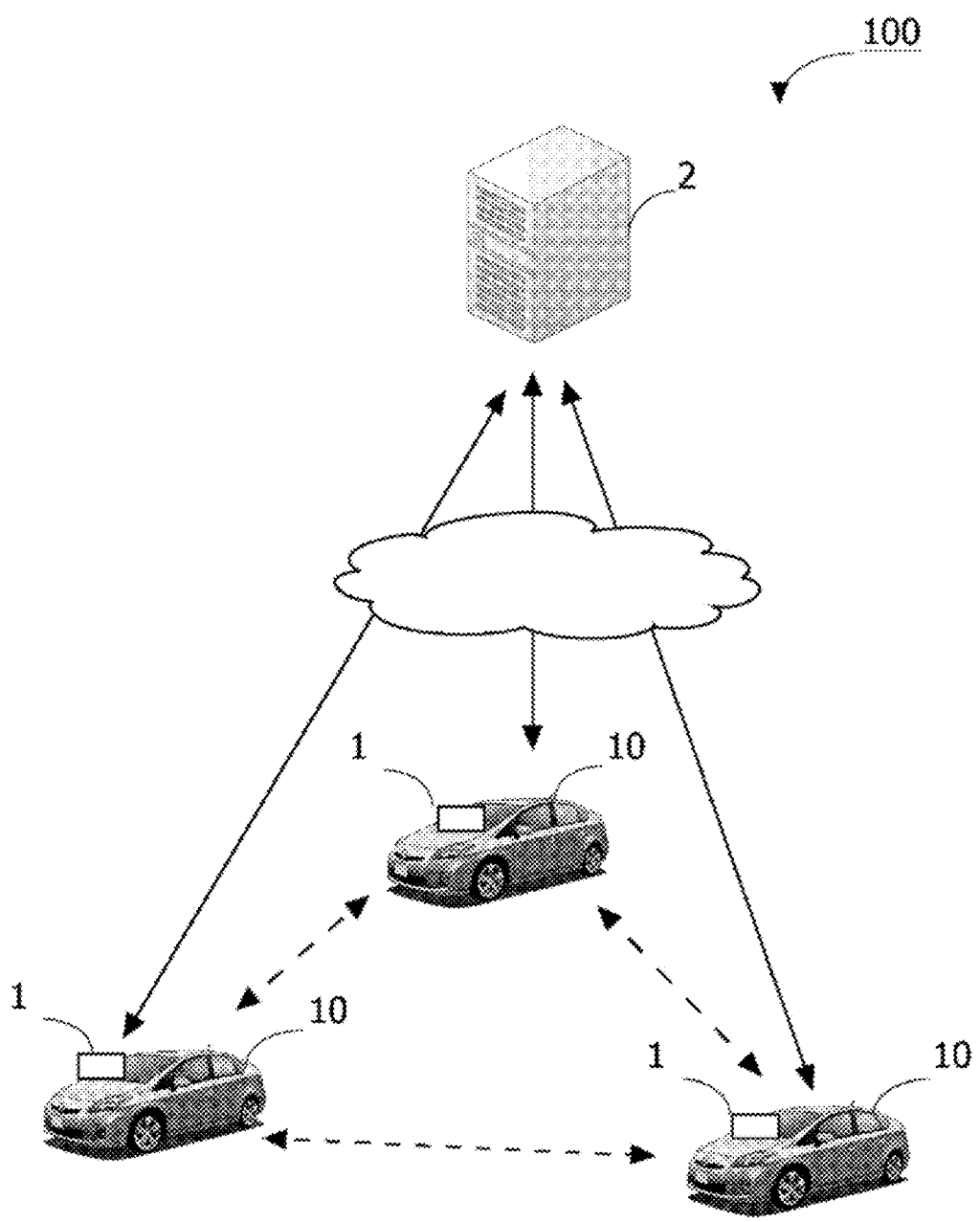
FIG. 1 is a diagram illustrating an example of a system configuration of a data collection system according to a first embodiment.

Hereinafter, an embodiment of the present disclosure will be described with reference to the drawings. The configuration of the following embodiment is merely an example, and the present disclosure is not limited to the configuration of the embodiment.

An aspect of the present disclosure provides an in-vehicle device. The in-vehicle device may include a first communicator, a second communicator, a storage and a controller. The first communicator may be a communicator used for communication with other in-vehicle devices. The second communicator may be a communicator used for communication with a predetermined transmission destination. The storage stores a plurality of information pieces and a list including identification information pieces for identifying the plurality of information pieces, respectively.

The controller may perform transmission processing for transmitting at least a part of the plurality of information pieces stored in the storage to the predetermined transmission destination. Also, the controller may transmit the list stored in the storage to a first in-vehicle device of the other in-vehicle devices and receive a first list including respective identification information pieces of information pieces each held by any of the other in-vehicle devices including the first in-vehicle device from the first in-vehicle device, through the first communicator, and if a first information piece, an identification information piece of which is included in both the first list and the list stored in the storage, is present in the storage, the controller may determine whether or not to transmit the first information piece in the transmission processing depending on whether or not a predetermined condition is met.

The first communicator and the second communicator may be physically-different communication units or identical communication units. The information pieces stored in the storage are, for example, data acquired by other devices such as sensors or information pieces generated by processing the data according to a predetermined method. However, the information pieces are not limited to these examples. The predetermined condition is, for example, a condition indicating which, the in-vehicle device itself or the first in-vehicle device that is the opposite party of the exchange of the lists, transmits the first information piece, the identification information piece of which is included in both the first list and the list stored in the storage, to the predetermined transmission destination.

According to the aspect of the present disclosure, if a determination is made not to transmit the first information piece, the identification information piece of which is included in both the first list received from the first in-vehicle device and the list stored in the storage, in the transmission processing for transmission to the predetermined transmission destination, the first information piece is not transmitted from the in-vehicle device itself to the predetermined transmission destination. Consequently, redundant transmission of the first information piece from the in-vehicle device itself and the first in-vehicle device Lo the predetermined transmission destination can be suppressed.

Also, in the aspect of the present disclosure, if the controller may make a determination not to transmit the first information piece in the transmission processing for transmission to the predetermined transmission destination, the controller may delete the first information piece, the identification information piece of which is included in both the first list received from the first in-vehicle device and the list stored in the storage, from the storage. Consequently, resources in the storage are released and the storage can store other new information piece, enabling efficient use of resources in the storage.

Also, in the aspect of the present disclosure, the controller may add a first identification information piece that is an identification information piece not included in the list stored in the storage but included in the first list received from the first in-vehicle device, to the list stored in the storage to update the list. Consequently, if the in-vehicle device exchanges lists with another in-vehicle device after the update, the information piece recognized by the in-vehicle device and held by an in-vehicle device other than the in-vehicle device that is the opposite party of the exchange can be provided to the in-vehicle device that is the opposite party of the exchange. For example, the in-vehicle device that is the opposite party of the exchange may make a determination not to transmit an information piece in a storage of the opposite party of the exchange, an identification information piece of the information piece being included in both the list obtained by the in-vehicle device that is the opposite party of the exchange as a result of the exchange and the list held by the opposite party of the exchange itself, to the predetermined transmission destination. In this case, the information piece is not transmitted from the in-vehicle device that is the opposite party of the exchange to the predetermined transmission destination, enabling suppression of redundant transmission of the information piece to the predetermined transmission destination. Also, identification information pieces of information pieces held by in-vehicle devices other than the in-vehicle device itself can also be provided to the opposite party of the exchange information, enabling enhancement in speed of transmission of information pieces held by any of in-vehicle devices.

Also, if the controller makes a determination not to transmit the first information piece provided with the identification information piece included in both the first list received from the first in-vehicle device and the list stored in the storage in the transmission processing for transmission to the predetermined transmission destination, deletion of the first information piece from the storage enables enhancement in speed of deleting the first information piece redundant between the plurality of in-vehicle devices.

Also, according to the aspect of the present disclosure, in the update of the list, the controller may update the list stored in the storage with an additional information piece associated with the first identification information piece, the additional information piece indicating that an information piece corresponding to the first identification information piece is held by any of the other in-vehicle devices. In this case, if a second list received from a second in-vehicle device of the other in-vehicle devices, the second list including respective identification information pieces of information pieces each held by any of the other in-vehicle devices including the second in-vehicle device, includes a second identification information piece with an additional information piece associated therewith, the controller may make a determination not to transmit an information piece of the information pieces stored in the storage, an identification information piece of the information piece matching the second identification information piece, in the transmission processing for transmission to the predetermined transmission destination. The second in-vehicle device may be an in-vehicle device that is the same as the first in-vehicle device or an in-vehicle device that is different from the first in-vehicle device. If the second in-vehicle device and the first in-vehicle device are the same, the second list is the same as the first list.

Consequently, regardless of whether or not the predetermined condition is met, the information piece in the storage, of which the additional information piece indicating that the information piece is held by another in-vehicle device and of which the identification information piece being associated with the information piece in the received list, is not transmitted to the predetermined transmission destination, enabling suppression of redundant transmission of the information piece to the predetermined transmission destination. Also, deletion of the information piece determined not to be transmitted in transmission to the predetermined transmission destination, from the storage enables enhancement in speed of deletion of the first information piece redundant between the plurality of in-vehicle devices.

Also, according to the aspect of the present disclosure, each of the additional information pieces may be an in-vehicle device identification information piece, and if the second identification information piece associated with the additional information piece is included in the second list received from the second in-vehicle device and the additional information piece associated with the second identification information piece indicates an identification information piece of the in-vehicle device itself, the controller may make a determination to transmit an information piece of the information pieces stored in the storage, an identification information piece of the information piece matching the second identification information piece, in the transmission processing for transmission to the predetermined transmission destination. Consequently, if an identification information piece of an information piece stored in the storage of the in-vehicle device itself is provided from another in-vehicle device, a situation in which none of the in-vehicle devices transmits the information piece to the predetermined transmission destination can be suppressed.

Another aspect of the present disclosure provides an information processing method including causing an in-vehicle device configured to perform transmission processing for transmitting at least a part of a plurality of information pieces stored in a storage to a predetermined transmission destination to: transmit a list including identification information pieces for identifying the plurality of information pieces in the storage, respectively, to a first in-vehicle device of other in-vehicle devices and receive a first list including respective identification information pieces of information pieces each held by any of the other in-vehicle devices including the first in-vehicle device from the first in-vehicle device, through a first communicator used for transmission with the other in-vehicle devices; and if a first information piece, an identification information piece of which is included in both the first list and the list stored in the storage, is present in the storage, determine whether or not to transmit the first information piece in the transmission processing depending on whether or not a predetermined condition is met.

Also, another aspect of the present disclosure provides a non-transitory computer-readable medium recorded with an information processing program for causing a computer to: perform transmission processing for transmitting at least a part of a plurality of information pieces stored in a storage to a predetermined transmission destination; transmit a list including identification information pieces for identifying the plurality of information pieces in the storage, respectively, to a first in-vehicle device of other in-vehicle devices and receive a first list including respective identification information pieces of information pieces each held by any of the other in-vehicle devices including the first in-vehicle device from the first in-vehicle device, through a first communicator used for transmission with the other in-vehicle devices; and if a first information piece, an identification information piece of which is included in both the first list and the list stored in the storage, is present in the storage, determine whether or not to transmit the first information piece in the transmission processing depending on whether or not a predetermined condition is met.

Note that the technical ideas disclosed with respect to the in-vehicle device as described above can be applied to the information processing method and the computer-readable medium recorded with the information processing program as described above as long as no technical contradiction arises.

First Embodiment

FIG. 1 is a diagram illustrating an example of a system configuration of a data collection system 100 according to a first embodiment. The data collection system 100 includes a plurality of vehicles 10 and a server Each vehicle 10 includes a data communication device 1 mounted thereon. The data collection system 100 according to the first embodiment is a system in which information pieces generated by data communication devices 1 in the respective vehicles 10 are transmitted by the respective data communication devices 1 and thereby collected in the server 2. Each data communication device 1 is an example of "in-vehicle device". The server 2 is an example of "predetermined transmission destination".

The server 2 is a communication node connected to a wide-area network such as the Internet. In the first embodiment, the server 2 is assumed to be a fixed communication apparatus but may be a mobile communication apparatus.

Each data communication device 1 has a function that communicates with the server 2 and further has a communication function that directly connects to other data communication devices 1. Communication between data communication devices 1 is referred to as "inter-vehicle communication". Communication between each data communication device 1 and the server 2 may be performed via, for example, a carrier network such as LTE (Long Term Evolution), LTE-Advanced or 3G, may be performed via a private network such as a wireless LAN (local area network) or may be performed using either of the above two networks depending on the situation. Inter-vehicle communication may be performed according to, for example, any of the standards such as WiFi Direct, Bluetooth (registered trademark), DSRC (Dedicated Short-Range Communications) and C-V2X.

Each vehicle 10 includes, for example, a camera, a GPS (global positioning system) and a plurality of sensors including, e.g., an acceleration sensor. For example, each data communication device 1 collects sensor data using the sensors included in the vehicle 10 and generates information to be transmitted to the server 2.

Since the data communication devices 1 generate information pieces respectively, the information pieces generated by the respective data communication devices 1 are highly likely to be redundant. Examples of the redundant information pieces generated by the data communication devices 1 include, e.g., image data and temperature data of a substantially same place and a substantially same time. However, redundant information (pieces) in the present description indicates, for example, information pieces that are the same in, e.g., attribute and/or situation of acquisition thereof and does not necessarily indicate information pieces that are identical to each other. Transmission of redundant information pieces to the server 2 may cause, for example, decrease in efficiency of use of resources due to, e.g., increase of a processing load on the server 2 and/or use of an unneeded communication band.

In the first embodiment, for example, the data communication devices 1 of vehicles 10 passing each other perform inter-vehicle communication with each other to exchange lists of information pieces held by the respective data communication devices 1 and suppress transmission of redundant information pieces to the server 2 by, for example, causing either one of the data communication devices 1 to transmit an redundant information piece to the server 2 and prevent the other of the data communication devices 1 from transmitting the redundant information piece.

FIG. 2 is a diagram illustrating an example of information collection processing in the data collection system 100 according to the first embodiment. In FIG. 2, for simplicity of description, instead of data communication devices 1, vehicles each including a data communication device 1 mounted thereon are illustrated. Also, FIG. 2 illustrates processing until two vehicles, vehicle #A and vehicle #B, transmit information pieces to the server 2. In FIG. 2, it is assumed that vehicle #A holds information pieces A, B and vehicle #B holds information pieces B, C in an initial state. Also, vehicle #A and vehicle #B held respective information lists including IDs of information pieces held respectively by vehicle #A and vehicle #B.

(1) First, the server 2 issues an information request to vehicles 10. Vehicle #A and vehicle #B receive the information request from the server 2. The request includes a request list including IDs of information pieces to be collected by the server 2 and a response waiting period. The ID of each information pieces is, for example, one generated according to a common generation method for the vehicles 10 and the server 2 included in the data collection system 100. The response waiting period is information indicating a timing for transmission of information to the server 2, and the vehicle 10 waits for transmission of information to the server 2 during the response waiting period. The response waiting period may, for example, be defined by relative time such as a predetermined period of time from reception of the request or be defined by an absolute time such as an end time and date. In (1) in FIG. 2, the request from the server 2 includes information pieces A, B, C as objects to be collected.

(2) Upon vehicle #A and vehicle #B approaching each other and a distance between vehicle #A and vehicle #B thus becoming a distance that enables inter-vehicle communication, vehicle #A and vehicle #B detect each other and exchange the information lists with each other. Consequently, vehicle #A recognizes that vehicle #B holds information piece B, C. Vehicle #B recognizes that vehicle #A holds information pieces A, B. Each of the information lists is an example of "list". The vehicle 10 that is the opposite party of exchange of the information lists is an example of "first in-vehicle device". The information list received from the vehicle 10 that is the opposite part of the exchange is an example of "first list".

(3) In the first embodiment, of vehicle #A and vehicle #B, vehicle #B that does not meet a transmission condition deletes information piece B redundant between vehicle #A and vehicle #B from a memory unit thereof. The transmission condition is a condition for determining which of vehicles that have exchanged information lists to transmit redundant information to the server 2. The transmission condition may be, for example, any of having a predetermined role of roles determined at the time of establishment of inter-vehicle communication, having larger or smaller individual identification information such as a MAC (media access control) address, having a larger or smaller evaluation value obtained by a predetermined calculation method and a predetermined priority being larger or smaller. Examples of the roles determined at the time of establishment of inter-vehicle communication include, e.g., a parent device and a child device in a wireless LAN and the roles are determined according to the method of the inter-vehicle communication. The transmission condition is an example of "predetermined condition".

(4) Upon an end of the response waiting period, vehicle #A and vehicle #B transmit respective information pieces each provided with an ID included in the respective request lists to the server 2. Vehicle #A holds information pieces A, B and thus transmits Information pieces A, B to the server 2. Vehicle #B holds information piece C and thus transmits information piece C to the server 2. Upon an end of the information transmission to the server 2, in the first embodiment, vehicle #A and vehicle #B delete the respective information pieces that have been transmitted to the server 2, from the respective memory units.

Consequently, information piece B redundant between vehicle #A and vehicle #B is not transmitted from vehicle #B to server 2 and respective single information pieces A, B, C are transmitted to the server 2, enabling collection of information pieces with no redundancy between vehicle #A and vehicle #B. Also, if redundancy of information piece B is detected as a result of exchanging information lists between vehicle #A and vehicle #B, vehicle #B detects information piece B from the memory unit thereof, enabling efficient use of a storage area in vehicle #B.

Figure 3:
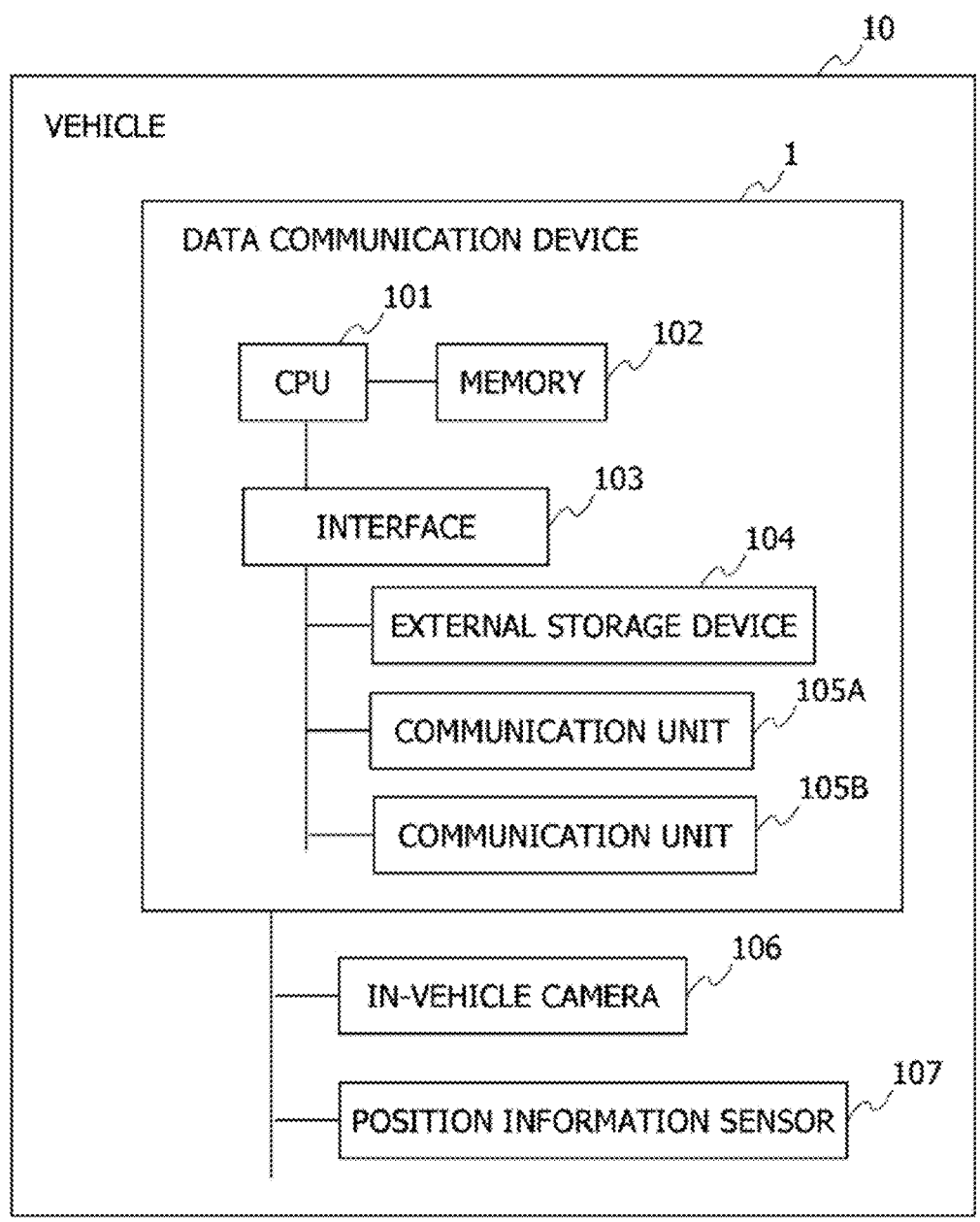
FIG. 3 is a diagram illustrating an example of a hardware configuration of a vehicle.

FIG. 3 is a diagram illustrating an example of a hardware configuration of a vehicle 10. In FIG. 3, a configuration relating to information collection in a hardware configuration of a vehicle 10 is extracted and illustrated. The vehicle 10 includes a data communication device 1, an in-vehicle camera 106 and a position information sensor 107 as hardware configuration components.

The data communication device 1 includes a CPU 101, a memory 102, an interface 103, an external storage device 105, a communication unit 105A and a communication unit 105B. The external, storage device 104, the communication unit 105A and the communication unit 105B are connected to the interface 103.

The CPU 101 executes a computer program developed to be executable in the memory 102, to perform processing as the data communication device 1. The memory 102 stores, e.g., the computer program to be executed by the CPU 101 and data to be processed by the CPU 101. The memory 102 is, for example, a dynamic random-access memory (DRAM), a static random-access memory (SRAM) or a read-only memory (ROM). The external storage device 104 is a non-volatile memory device, for example, a hard disk drive or a solid-state drive (SSD). The CPU 101 is an example of "controller". The external storage device 104 is an example of "storage".

The communication unit 105A is connected to, for example, a carrier network such as LTE, LTE-Advanced or 3G to connect to a public communication network and communicate with the server 2 in the network through the public communication network. The communication unit 105A is an example of "second communicator".

The communication unit 105B is connected to, for example, a private network such as WiFi to connect to a public communication network and communicate with the server 2 in the network through the public communication network or directly connect to and communicate with another data communication device 1 via, e.g., WiFi-direct. In the first embodiment, inter-vehicle communication is performed using the communication unit 105B. However, in the first embodiment, also, the communication unit 105B may be used for information transmission to the server 2. The communication unit 105B is an example of "first communicator". Here, for example, when information is transmitted to the server 2 via WiFi, the communication unit 105B that performs WiFi communication is an example of the "second communicator".

Although in FIG. 3, the interface 103 is illustrated, transmission/reception of signals between the CPU 101 and the external storage device 104, the communication unit 105A and the communication unit 105B is not limited to transmission/reception via the interface 103. In other words, the CPU 101 may have a plurality of signal transmission channels other than the interface 103. Also, in FIG. 3, the data communication device 1 includes a single CPU 101. However, the CPU is not limited to a single processor and may have a multi-processor configuration. Also, a single CPU connected via a single socket may have a multi-core configuration. At least a part of processing in the respective units above may be performed by a processor other than the CPU, for example, a special purpose processor such as a digital signal processor (DSP) or a graphics processing unit (GPU). Also, at least part of processing in the respective units above may be performed by an integrated circuit (IC) or another digital circuit. Also, at least a part of the respective units above may include an analog circuit.

The in-vehicle camera 106 picks up an image at a predetermined image pickup rate and writes the picked-up image to a frame buffer. The in-vehicle camera 106 is installed, for example, with a direction of travel of the vehicle 10 as an image pickup direction. However, the image pickup direction is not limited to this example. Also, for example, the in-vehicle camera 106 may be one that can horizontally change a lens at a predetermined angle. The position information sensor 107 acquires information on a position of the vehicle 10 in a predetermined period. The position information sensor 107 is, for example, a global positioning system (GPS) reception unit.

Note that the hardware Configurations of the vehicle 10 and the data communication device 1 are not limited to those illustrated in FIG. 3. For example, the vehicle 10 may include sensors such as an acceleration sensor and a temperature sensor in addition to the in-vehicle camera 106 and the position information sensor 107.

Also, in an embodiment in which inter-vehicle communication is performed by means of, e.g., Bluetooth (registered trademark) or DSRC (dedicated short-range communication), the data communication device 1 may include a communication unit compatible with, e.g., Bluetooth (registered trademark) or DSRC as a communication unit for performing inter-vehicle communication, in addition to the communication unit 105A and the communication unit 105B. In this case, the communication unit compatible with, e.g., Bluetooth (registered trademark) or DSRC is an example of "first communicator". Also, the data communication device 1 may include a communication unit compatible with, e.g., LPWA (low-power wide-area) as a communication unit for communication with the server 2. In this case, the communication unit compatible with LPWA is an example of "second communicator".

Figure 4:
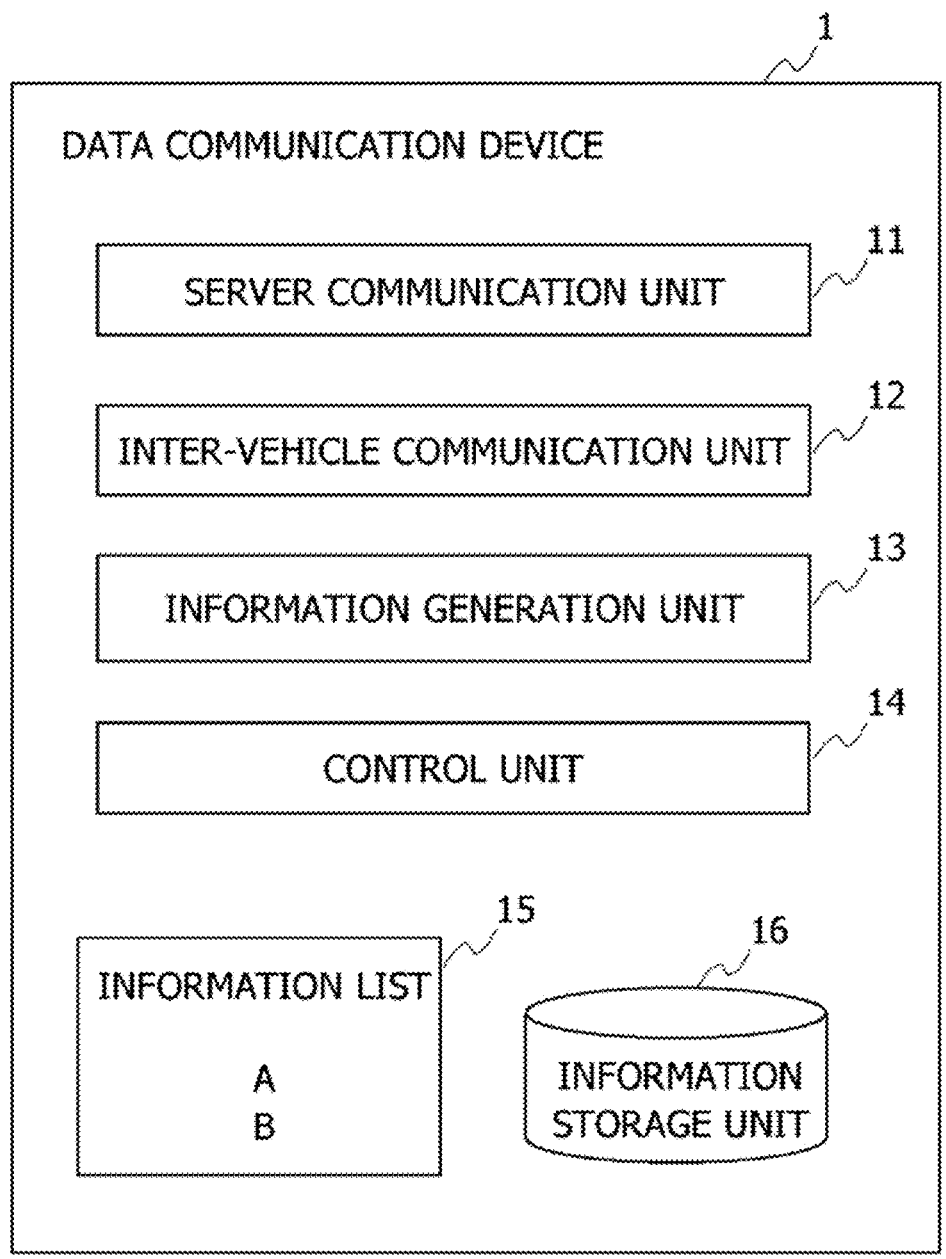
FIG. 4 is a diagram illustrating an example of a functional configuration of the data communication device.

FIG. 4 is a diagram illustrating an example of a functional configuration of the data communication, device 1. The data communication device 1 operates as the respective units illustrated as an example in FIG. 4 by means of the computer program in the memory. In other words, the data communication device 1 includes a server communication unit 11, an inter-vehicle communication unit 12, an information generation unit 13, a control unit 14, an information list 15 and an information storage unit 16 as functional components.

The server communication unit 11 is an interface for communication with the server 2. For example, the server communication unit 11 receives an information request from the server 2 and outputs the information request to the control unit 14. For example, the server communication unit 11 receives information from the control unit 14 and transmits the information to the server 2. For example, the server communication unit 11 selects a communication unit to be used, according to connection statuses of the communication unit 105A and the communication unit 105B to establish communication with the server 2. For example, the server communication unit 11 preferentially selects the communication unit 105B (WiFi) that is lower in cost than the communication unit 105A (carrier network).

The inter-vehicle communication unit 12 is an interface for inter-vehicle communication with other data communication devices 1. For example, the inter-vehicle communication unit 12 is activated according to an instruction from the control unit 14 and performs Communication using the communication unit 105B. For example, the inter-vehicle communication unit 12 transmits a copy of the information list 15 by means of broadcasting or multicasting through the communication unit 105B in a predetermined period. On the other hand, the inter-vehicle communication unit 12 performs processing for reception of an inter-vehicle communication signal in a predetermined period to receive an information list 15 transmitted from another data communication device 1. As described above, in the first embodiment, the data communication devices 1 transmit the respective information lists 15 to each other by means of broadcasting or multicasting to exchange the information lists 15 with each other. Note that the method of exchange of the information lists 15 between the inter-vehicle communication unit 12 and another data communication device 1 is not limited to this example. For example, depending on the method of communication of the communication unit 105B, the inter-vehicle communication unit 12 may establish connection with another data communication device 1, then transmit the information list 15 to the other data communication device 1 and receive the information list 15 of the other data communication device 1 from the other data communication device 1.

For example, the information generation unit 13 generates information to foe transmitted to the server 2 by, e.g., acquiring sensor data acquired by the sensors mounted on the vehicle 10 such as the in-vehicle camera 106 and the position information sensor 107, in a predetermined period and converting the sensor data into a predetermined format. In the first embodiment, the information generation unit 13 generates an ID for the generated information according to a predetermined generation method and provides the ID to the generated information. The information generation unit 13 outputs the information provided with the ID to the information storage unit 16. Also, the information generation unit 13 registers the ID of the generated information in the information list 15. The information generated by the information generation unit 13 is an example of "information piece". The ID of the information is an example of "identification information piece".

The control unit 14 receives an input of an information request received from the server 2, from the server communication unit 11. Together with the information request, information on a request list including an ID of information that is a target of a transmission request and a response waiting period designating a transmission timing is also received from the server 2.

Upon a lapse of the response waiting period, the control unit 14 performs processing for information transmission to the server 2 in which information matching the request list in the information held in the information storage unit 16 is transmitted to the server 2 through the server communication unit 11. The processing for information transmission to the server 2 is an example of "transmission processing".

Also, upon reception of the information request from the server 2, the control unit 14 activates the inter-vehicle communication unit 12 to start information list exchange processing. In the information list exchange processing, for example, the control unit 14 reads out the information list 15, outputs a copy of the information list 15 to the inter-vehicle communication unit 12 and transmits the copy of the information list 15 by means of broadcasting or multicasting through the inter-vehicle communication unit 12, in a predetermined period. Also, for example, the control unit 14 causes the inter-vehicle communication unit 12 to perform reception processing to receive an information list 15 transmitted from another data communication device 1 through the inter-vehicle communication unit 12, in a predetermined period.

Upon reception of the information list 15 of the other data communication device 1 through the inter-vehicle communication unit 12, the control unit 14 compares the information list 15 in the data communication device itself and the information list 15 in the other data communication device 1 with each other. The control unit 14 determines whether or not a transmission condition is met. The transmission condition is a condition for the data communication device itself to transmit information, an ID of which is redundant, between the information list 15 of the data communication device itself and the information list 15 received from the other data communication device 1, to the server 2. The transmission condition is, for example, set in advance in common to all the data communication device 1 in the data collection system 100 based on, e.g., respective roles in inter-vehicle communication and the sizes of individual identification information pieces such as MAC addresses.

If the transmission condition is met, the control unit 14 makes a determination to transmit information provided with an ID included in both the information list 15 of the data communication device itself and the information list 15 of the other data communication device 1 in the processing for information transmission to the server 2. Also, if the transmission condition is not met, the control unit 14 makes a determination not to transmit information provided with an ID included in both the information list 15 of the data communication device itself and the information list 15 of the other data communication device 1 in the processing of information transmission to the server 2. Also, in this case, the control unit 14 deletes the information from the information storage unit 16. Subsequently, the control unit 14 deletes the ID provided to the information deleted from the information storage unit 16, from the information list 15 to update the information list 15.

Therefore, in the processing for information transmission to the server 2, which is performed upon a lapse of the response waiting period, if the transmission condition is not met, the information provided with an ID included in both the information list 15 of the data communication device itself and the information list 15 of the ether data communication device 1 are not transmitted to the server 2.

Upon completion of the processing of information transmission to the server 2, the control unit 14 deletes the information that has been transmitted to the server 2, from the information storage unit 16. Also, the control unit 14 deletes the ID provided to the information that has been transmitted to the server 2, from the information list 15 to update the information list 15. Here, if no information provided with an ID matching the ID included in the request list is held in the information storage unit 16, upon a lapse of the response waiting period, the control unit 14 updates the above information list 15 without transmission of any information to the server 2.

The information list 15 is stored in, for example, the external storage device 104. In the first embodiment, the information list 15 includes an ID of information included in the information storage unit 16 held in the data communication device itself. The information list 15 is blank in an initial state. In the first embodiment, the information list 15 is updated when information is added to the information storage unit 16 and when information is deleted from the information storage Unit 16. The information list 15 is an example of "list".

The information storage unit 16 is created in a storage area in the external storage device 104. The information storage unit 16 holds information generated from sensor data by the information generation unit 13 in the relevant device. The information storage unit 16 is empty in an initial state.

<Flow of Processing>

FIG. 5 is an example of a flowchart of processing in the control unit 14 of the data communication device 1 according to the first embodiment. The processing illustrated in FIG. 5 is, for example, repeated in a predetermined period. Although an entity that performs the processing illustrated in FIG. 5 is the CPU 101 of the data communication device 1, for sake of convenience, the processing will be described with the control unit 14, which is a functional component, as the entity. The same applies to the flowcharts of the processing in the data communication device 1 in FIG. 5 onwards.

In OP101, the control unit 14 determines whether or not an information request has been received from the server 2 through the server communication unit 11. If an information request has been received from the server 2 (OP101: YES), the processing proceeds to OP102. If no information request has been received from the server 2 (OP101: NO), the processing illustrated in FIG. 5 ends.

In OP202, the control unit 14 activates the inter-vehicle communication unit 12 to start inter-vehicle communication. In OP103, the control unit 14 determines whether or not the inter-vehicle communication unit 12 has detected another data communication device 1 and established connection with the other data communication device 1. If another data communication device 1 has been detected and connection with the other data communication device 1 has been stablished (OP103: YES), the processing proceeds to OP104. If no data communication device 1 has been detected (OP103: NO), the processing proceeds to OP109.

In OP104, the control unit 14 exchanges information lists 15 with the other data communication device 1. The exchange of information lists 15 is performed by, for example, the data communication devices 1 transmitting the respective information lists 15 to each other by means of broadcasting or multicasting. However, the method of the exchange is net limited to this example, and for example, the data communication device 1 may establish connection with the other data communication device 1 on a one-by-one basis, transmit a copy of the information list 15 of the data communication device itself through the inter-vehicle communication unit 12 to the other data communication device 1 and receive a copy of the information list 15 of the other data communication device 1 from the other data communication device 1. Hereinafter, the information list 15 received as a result of the exchange of information lists 15 with the other data communication device 1 is simply referred to as "received list". Therefore, hereinafter, unless otherwise specifically stated, "information list 15" refers to the information list 15 of the data communication device itself.

In OP105, the control unit 14 determines whether or not a transmission condition is met. If the transmission condition is met (OP105: YES), the processing proceeds to OP106, and in OP106, the control unit 14 makes a determination to transmit information provided with an ID redundant between the information list 15 and the received list in processing for information transmission to the server 2. If the transmission condition is not met (OP205: NO), the processing proceeds to OP107, and in OP107, the control unit 14 makes a determination not to transmit information provided with an ID redundant between the information list 15 and the received list in processing for information transmission to the server 2.

In OP108, the control unit 14 deletes the information provided with an ID redundant between the information list 15 and the received list from the information storage unit 16. Also, the control unit 14 deletes the ID of the deleted information from the information list 15.

In OP109, the control unit 14 determines whether or not the response waiting period has passed. If the response waiting period has passed (OP109: YES), the processing proceeds to OP110. If the response waiting period has not yet passed (OP109: NO), the processing proceeds to OP103 and the processing from OP103 is repeated.

In OP110, the control unit 14 performs processing for information transmission to the server 2 by reading out information provided with an ID included in a request list received together with the information request, in information held in the information storage unit 16 and transmitting the information to the server 2 through the server communication unit 11.

In OP111, the control unit 14 deletes the information that has been transmitted to the server 2, from the information storage unit 16. Also, the control unit 14 deletes the ID included in the request list from the information list 15 to update the information list 15. Subsequently, the processing illustrated in FIG. 5 ends.

Note that the processing in the control unit 14 of the data communication device 1 illustrated in FIG. 5 is a mere example and the processing in the control unit 14 is not limited to the processing illustrated in FIG. 5.

<Operation and Effects of the First Embodiments>

In the first embodiment, exchange of information lists 15 is performed between data communication devices 1, which are sources of transmission or generation of information/and redundant information is not transmitted to the server 2 from either one of the data communication devices 1. Therefore, the first embodiment enables suppression of transmission of redundant information to server 2 by a data communication device 1. Therefore, an amount of information collected to the server 2 can be reduced, enabling reduction of a processing load on the server 2. Also, consequently, use of a communication band between the server 2 and the data communication devices 1 can be reduced.

Also, in the first embodiment, information redundant with information in another data communication device 1 and determined not to be transmitted in processing for information transmission to the server 2 is deleted from the memory unit (information storage unit) of the data communication device 1 and thus such deletion enables holding new information and thus enables efficient use of memory resources.

Also, in the first embodiment, each data communication device 1 deletes information transmitted to the server 2, from the information storage unit 16. Consequently, each data communication device 1 can be prevented from retransmitting information already transmitted to the server 2 and also memory resources of the data communication device 1 can efficiently be used.

<First Modification>

In the first embodiment, an information list 15 holds an ID of information held in the information storage unit 16 of the data communication device itself and no information in an information list 15 received from another data communication device 1 is reflected in the information list 15. In a first modification, instead, a data communication device 1 updates an information list 15 of the data communication device itself using a content of an information list 15 received from another data communication device 1. Therefore, in the first modification, an information list 15 includes, in addition to an ID of information held in an information storage unit 16 of the data communication device itself, an ID of information held by another data communication device 1 obtained as a result of exchange of information lists 15 with the other data communication device 1.

In the first modification, as in the first embodiment, a control unit 14 exchanges information lists 15 with another data communication device 1. The control unit 14 adds (merges) an ID included in the information list 15 received from the other data communication device 1 but not included in the information list 15 of the data communication device itself to the information list 15 of the data communication device itself to update the information list 15 of the data communication device itself.

FIG. 6 is an example of a flowchart of processing in a control unit 14 of a data communication device 1 according to the first modification. In FIG. 6, processing that is the same as that of the first embodiment in FIG. 5 is provided with a reference numeral that is the same as that of the first embodiment. The processing illustrated in FIG. 6 is repeated, for example, in a predetermined period.

Upon reception of an information request from a server 2 (OP101: YES), the control unit 14 starts inter-vehicle communication (OP102), and upon detection of another data communication device 1 (OP103: YES), the control unit 14 exchanges information lists 15 with the other data communication device 1 (OP104), and if a transmission condition is not met (OP105: NO), the control unit 14 makes a determination not to transmit information redundant with information in the other data communication device 1 to the server 2 (OP107) and deletes the information and updates the information list (OP108).

In OP201, the control unit 14 merges the information list 15 received from the other data communication device 1 into the information list 15 of the relevant device. Subsequently, as in the first embodiment, upon a lapse of a response waiting period (OP109: YES), the control unit 14 performs processing for information transmission to the server 2 (OP110) and deletes the transmitted information from the information storage unit 16 and updates the information list 15 (OP111).

Figure 7A:
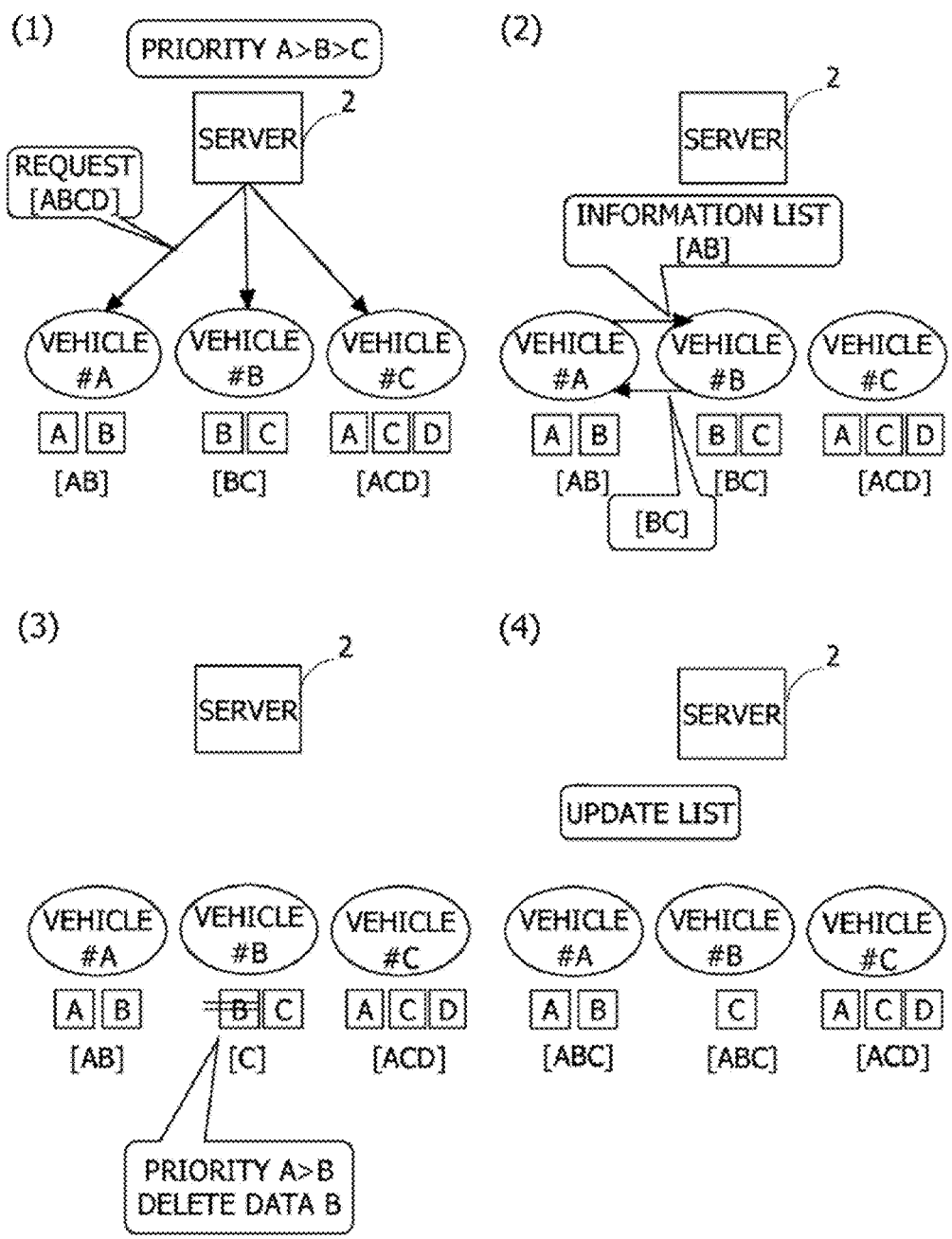
FIG. 7A is a diagram illustrating an example of information collection processing in a data collection system according to the first modification.

FIGS. 7A and 7B are diagrams illustrating an example of information collection processing in a data collection system 100 according to the first modification. In FIGS. 7A and 7B, for simplicity of description, instead of data communication devices 1, vehicles each including a data communication device 1 mounted thereon are illustrated. Also, FIGS. 7A and 7B illustrate processing until three vehicles, vehicle #A, vehicle #B and vehicle #C, transmit respective information pieces to a server 2. In FIGS. 7A and 7B, it is assumed that vehicle #A holds information pieces A, B, vehicle #B holds information pieces B, C and vehicle #C holds information pieces A, B, C in an initial state.

Also, in FIGS. 7A and 7B, each of information lists 15 held by the respective vehicles is indicated in brackets ([ ]). In FIGS. 7A and 7B, it is assumed that in an initial state, the information list 15 of each vehicle include IDs of information pieces held in the vehicle itself and exchange of information lists 15 with other vehicles has not yet performed.

Also, in FIGS. 7A and 7B, it is assumed that a priority order is: vehicle #A>vehicle #B>vehicle #C. This priority order is, for example, a priority order of becoming a parent device in a wireless LAN or a descending order of MAC address sizes. In FIGS. 7A and 7B, a transmission condition is that the priority order is higher.

(1) First, the server 2 issues an information request to vehicles 10. Vehicle #A, vehicle #B and vehicle #C receive the information request from the server 2 (OP101 in FIG. 6). In (1) of FIG. 7A, the information request from the server 2 includes information pieces A, B, C, D as objects to be collected.

(2) Upon vehicle #A and vehicle #B approaching each other and a distance between vehicle #A and vehicle #B thus becoming a distance that enables inter-vehicle communication, vehicle #A and vehicle #B detect each other and exchange the information lists 15 with each other (OP104 in FIG. 6). (3) Vehicle #B having a lower priority order, of vehicle #A and vehicle #B makes a determination not to transmit information piece B redundant between the information lists 15 of vehicle #A and vehicle #B to the server 2 and deletes information piece B (OP105: NO, OP107 and OP108 in FIG. 6). Also, in vehicle #B, as a result of the deletion of the information piece B, an ID of information piece B is also deleted from the information list 15 and the information list 15 is thereby updated.

(4) Vehicle #A and vehicle #B update the respective information lists 15 (OP201 in FIG. 6). Vehicle #A adds an ID of information piece C not included in the information list of vehicle #A but included in the information list 15 received from vehicle #B to information list 15 of vehicle #A. Vehicle #B adds IDs of information pieces A, B not included in the information list of vehicle #B but included in the information list 15 received from vehicle #A to the information list 15 of vehicle #B. Consequently, the IDs of information pieces A, B, C are included in each of the respective information lists 15 of vehicle #A and vehicle #B.

(5) of FIG. 7B Next, upon vehicle #B and vehicle #C approaching each other and a distance between vehicle #B and vehicle #C thus becoming a distance that enables inter-vehicle communication, vehicle #B and vehicle #C detect each other and exchange the information lists 15 with each other (OP104 in FIG. 6). (6) Vehicle #C having a lower priority order, of vehicle #B and vehicle #C makes a determination not to transmit information pieces A, C redundant between the information lists 15 of vehicle #B and vehicle #C to the server 2 and deletes information pieces A, C (OP105: NO, OP107 and OP108 in FIG. 6). Also, in vehicle #C, as a result of the deletion of information pieces A, C, the IDs of the information pieces A, C are also deleted from the information list 15 and the information list 15 is thereby updated.

(7) Vehicle #B and vehicle #C update the respective information lists 15 (FIG. 6, OP201). Vehicle #B adds an ID of information piece D not included in the information list of vehicle #B but included in the information list 15 received from vehicle #C to information list 15 of vehicle #B. Vehicle #C adds the IDs of the information pieces A, B, C not included in information list of vehicle #C but included in the information list 15 received from vehicle #B to the information list 15 of vehicle #C. Consequently, the IDs of information pieces A, B, C, D are included in each of the respective information lists 15 of vehicle #B and vehicle #C.

(8) Upon a lapse of a response waiting period, vehicle #A, vehicle #B and vehicle #C transmit respective information pieces provided with the IDS included in the respective request lists to the server 2 (OP109: YES and OP110 in FIG. 6). Since vehicle #A holds information pieces A, B, vehicle #A transmits information pieces A, B to the server 2. Since vehicle #B holds information piece C, vehicle #B transmits information piece C to the server 2. Since vehicle #C holds information piece D, vehicle #C transmits information piece D to the server 2. Upon an end of information transmission to the server 2, vehicle #A, vehicle #B and vehicle #C delete the respective information pieces that have been transmitted to the server 2, from respective memory units and delete the respective IDs of the transmitted information pieces and the IDs included in the request list, from the respective information list 15 (OP111 in FIG. 6). As a result, in FIG. 7B, each of the information lists 15 of vehicle #A, vehicle #B and vehicle #C becomes blank.

In (8) of FIG. 7B, the respective single information pieces A, B, C, D are transmitted to the server 2 and redundant transmission is thus avoided. Therefore, the first modification also enables suppression of transmission of redundant information to the server 2.

For example, in the processing illustrated in FIGS. 7A and 7B, if merging of information lists 15 is not performed, in (6) of FIG. 7B, information piece A is not deleted from vehicle #C and in (8) of FIG. 7B, information piece A is transmitted from vehicle #A and vehicle #C to the server 2. In other words, merging of an information list 15 received from another data communication device 1 into an own information list 15 enables enhancement in speed of removal of information held by and redundant between data communication devices 1.

Second Modification

In a second modification, also, a data communication device 1 reflects information in an information list 15 received from another data communication device 1, in an own information list 15. However, in the second modification, in the information list 15, such information is clearly indicated as information held by the other data communication device 1.

More specifically, in the second modification, in an information list 15, an ID of information held by another data communication device 1 is registered in association with an ID of the other data communication device 1. In the below, in order to distinguish between an ID of information and an ID of a data communication device 1, the ID of the information is referred to as "information ID" and the ID of the data communication device 1 is referred to as "device ID". Also, a list received from another data communication device 1 is simply referred to as "received list". Therefore, hereinafter, unless otherwise specifically stated, an information list 15 refers to an information list 15 of a data communication device itself. A device ID associated with an ID of an information ID in an information list 15 is an example of "additional information piece" and "device identification information piece".

A device ID of a data communication device 1 that is an opposite party of exchange of information lists 15 may be acquired, for example, through processing for establishment of connection for inter-vehicle communication or device IDs may be exchanged together with the exchange of information lists 15.

In the second modification, if no device ID is attached to an information ID in a received list, the information ID being not included in an own information list 15, a control unit 14 adds a device ID of a data communication device 1 that is an opposite party of exchange of information lists 15 to the own information list 15 in association with the information ID. Also, if a device ID is attached to information ID in a received list, the information ID being not included in the information list 15, the association between the information ID and the device ID is added to the information list 15 as it is. Note that an information ID included in both the information list 15 and the received list is not updated.

In other words, in the information list 15, an information ID with no device ID attached thereto indicates that the information ID is an information ID of information held in an information storage unit 16 of the data communication device itself. Also, in the information list 15, an information ID with a device ID attached thereto indicates that the information ID is an information ID of information not held in the information storage unit 16 of the data communication device itself bur held in any of other data communication devices 1.

Also, in the second modification, redundant information is removed as follows. If a transmission condition is not met, the control unit 14 makes a determination not to transmit information corresponding to an information ID with no device ID attached thereto, the information ID being redundant between the own information list 15 and a received list, in processing for information transmission to the server 2 and deletes the information from the information storage unit 16.

Also, regardless of whether or not the transmission condition is met, if an information ID with no device ID attached thereto in the own information list 15 and an information ID with a device ID attached thereto in a received list match each other, the control unit 14 wakes a determination not to transmit information corresponding to the information ID in processing for information transmission to the server 2 and deletes the information from the relevant information storage unit 16. This is because the matching indicates that a third party other than the data communication device 1 with which the data communication device itself has exchanged lists holds information of the information ID.

However, if an information ID with no device ID attached thereto in the own information list 15 and an information ID with a device ID attached thereto in the received list match each other and the device ID attached to the information ID in the received list indicates the data communication device itself, the control unit 14 makes a determination to transmit information corresponding to the information ID in processing for information transmission to the server 2 and does not delete the information from the information storage unit 16.

In this case, this is because such matching indicates that information held in the relevant device has returned to the data communication device itself through the other data communication device 1.

FIG. 8 is an example of a flowchart of processing in the control unit 14 of the data communication device 1 according to the second modification. In FIG. 8, processing that is the same as that of FIG. 5 in the first embodiment and that of FIG. 6 in the first modification is provided with a reference numeral that is the same as that of the processing in FIGS. 5 and 6. The processing illustrated in FIG. 8 is, for example, repeated in a predetermined period.

Upon reception of an information request from the server 2 (OP101: YES), the control unit 14 starts inter-vehicle communication (OP102) and upon detection of another data communication device 1 (OP103: YES), exchanges information lists 15 with the other data communication device 1 (OP104).

In OP301, the control unit 14 performs redundant information removal processing. The redundant information removal processing is processing for removing information redundant between the data communication device itself and the other data communication device 1. Details of the redundant information removal processing will be described later.

In OP302, the control unit 14 performs information list reflection processing. The information list reflection processing is processing for reflecting information in the received list in the information list 15. Details of the information list reflection processing will be described later.

Subsequently, as in the first embodiment, upon a lapse of a response waiting period (OP109: YES), the control unit 14 performs processing for information transmission to the server 2 (OP110) and deletes the transmitted information from an information storage unit 16 and updates the information list 15 (OP111).

Figure 9:
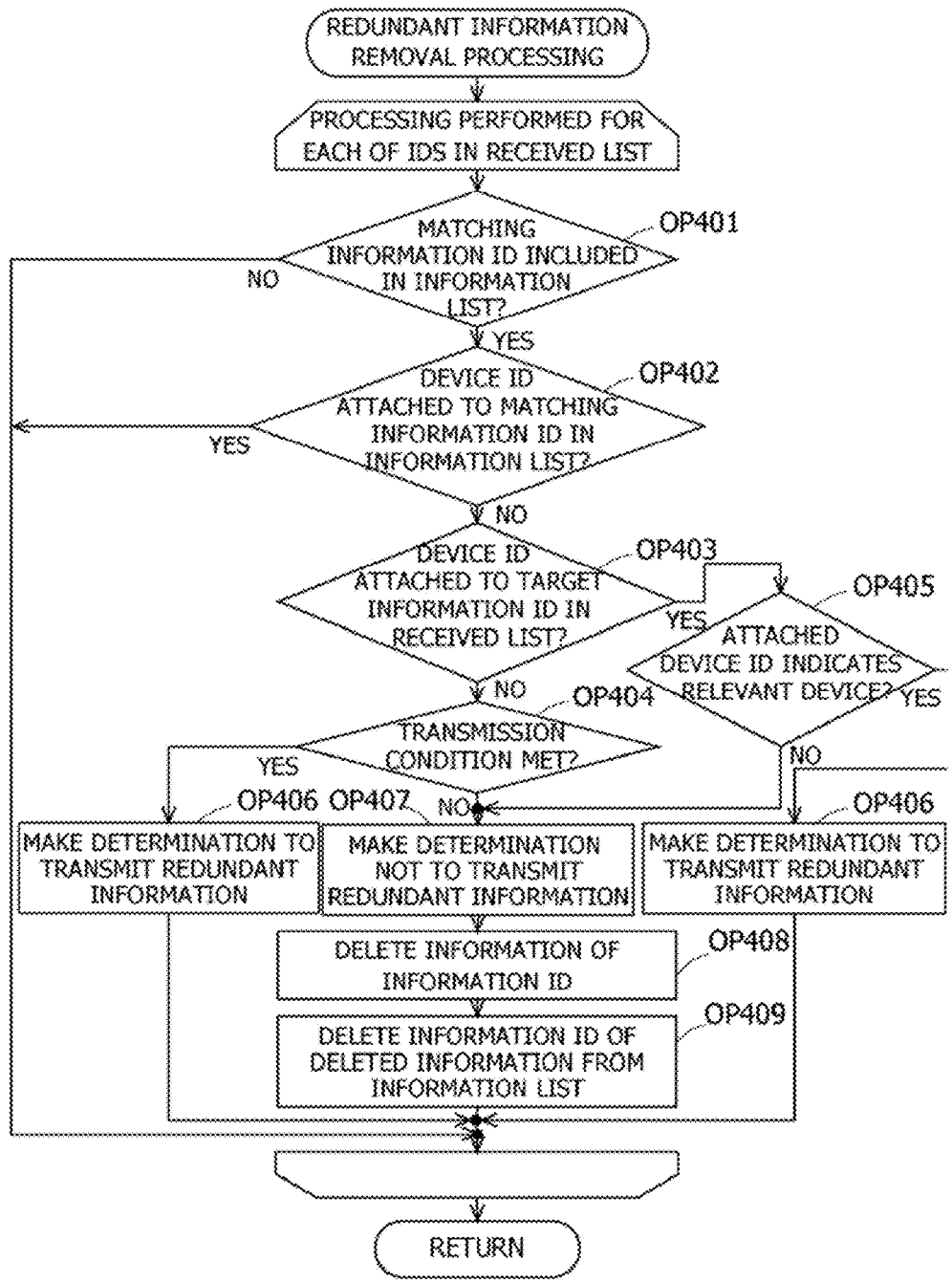
FIG. 9 is an example of a flowchart of the redundant information removal processing in the control unit according to the second modification.

FIG. 9 is an example of a flowchart of the redundant information removal processing in the control unit 14 according to the second modification. The processing illustrated in FIG. 9 is the processing performed in OP301 in FIG. 8. The processing from OP401 to OP409 in FIG. 9 is performed for each of information IDs included in the received list.

In OP401, the control unit 14 determines whether or not an information ID matching a target information ID in the received list is included in the information list 15. If an information ID matching the target information ID in the received list is included in the information list 15 (OP401: YES), the processing proceeds to OP402. If an information ID matching the target information ID in the received list is not included in the information list 15 (OP401: NO), the processing illustrated in FIG. 9 for the target information ID ends.

In OP402, the control unit 14 determines whether or not a device ID is attached to the information ID matching the target information ID in the received list, in the information list 15. If a device ID is attached to the information ID matching the target information ID in the received list, in the information list 15 (OP402: YES), the processing illustrated in FIG. 9 for the target information ID ends. If no device ID is attached to the information ID matching the target information ID in the received list, in the information list 15 (OP402: NO), the processing proceeds to OP403.

In OP403, the control unit 14 determines whether or not a device ID is attached to the target information ID in the received list. If a device ID is attached to the target information ID in the received list (OP403: YES), the processing proceeds to OP405. If no device ID is attached to the target information ID in the received list (OP403: NO), the processing proceeds to OP404.

In OP404, the control unit 14 determines whether or not a transmission condition is met. If the transmission condition is met (OP404: YES), the processing proceeds to OP406. If the transmission condition is not met (OP404: NO), the processing proceeds to OP407.

In OP405, the control unit 14 determines whether or not the device ID attached to the target information ID in the received list is the device ID of the data communication device itself. If the device ID attached to the target information ID in the received list is the device ID of the data communication device itself (OP405: YES), the processing proceeds to OP406. If the device ID attached to the target information ID in the received list is not the device ID of the data communication device itself (OP405: NO), the processing proceeds to OP407.

In OP406, the control unit 14 makes a determination to transmit information provided with the ID redundant between the information list 15 and the received list, in processing for information transmission to the server 2. Subsequently, the processing illustrated in FIG. 9 for the target information ID ends.

In OP407, the control unit 14 makes a determination not to transmit information provided with the ID redundant between the information list 15 and the received list, in processing for information transmission to the server 2.

In OP408, the control unit 14 deletes the information of the information ID matching the target information ID from the information storage unit 16. In OP409, the control unit 14 deletes the information ID of the information deleted from the information storage unit 16, from the information list 15. Subsequently, the processing illustrated in FIG. 9 for the target ID in the received list ends. Upon an end of the processing illustrated in FIG. 9 for all of the information IDs included in the received list, the processing proceeds to OP302 in FIG. 8. Here, the redundant information removal processing illustrated in FIG. 9 is a mere example and the redundant information removal processing is not limited to this example.

FIG. 10 is an example of a flowchart of the information list reflection processing in the control unit 14 according to the second modification. The processing illustrated in FIG. 10 is the processing performed in OP302 in FIG. 8. The processing from OP501 to OP504 in FIG. 10 is performed for each of information IDs included in the received list.

In OP501, the control unit 14 determines whether or not an information ID matching a target information ID in the received list is included in the information list 15. If an information ID matching the target information ID in the received list is included in the information list 15 (OP501: YES), the processing illustrated in FIG. 10 for the target information ID in the received list ends. If no information ID matching the target information ID in the received list is included in the relevant information list 15 (OP501: NO), the processing proceeds to OP502.

In OP502, the control unit 14 determines whether or not a device ID is attached to the target information ID in the received list. If a device ID is attached to the target information ID in the received list (OP502: YES), the processing proceeds to OP504. If no device ID is attached to the target information ID in the received list (OP502: NO), the processing proceeds to OP503.

In OP503, since the information ID not included in the information list 15 is included in the received list and no device ID is attached to the information ID in the received list, the control unit 14 adds the target information ID to the information list 15, in association with an device ID of the data communication device 1 that is the opposite party of exchange of information lists 15. Subsequently, the processing illustrated in FIG. 10 for the target information ID in the received list ends.

In OP504, since the information ID not included in the information list 15 is included in the received list, and a device ID is attached to the information ID in the received list, the control unit 14 adds the association between the target information ID and the device ID in the received list to the information list 15 as it is. Subsequently, the processing illustrated in FIG. 10 for the target information ID in the received list ends. Upon an end of the processing illustrated in FIG. 10 for all of the information IDs included in the received list, the processing proceeds to OP107 in FIG. 8. Here, the information list reflection processing illustrated in FIG. 10 is a mere example and the information list reflection processing is not limited to this example.

Figure 11A:
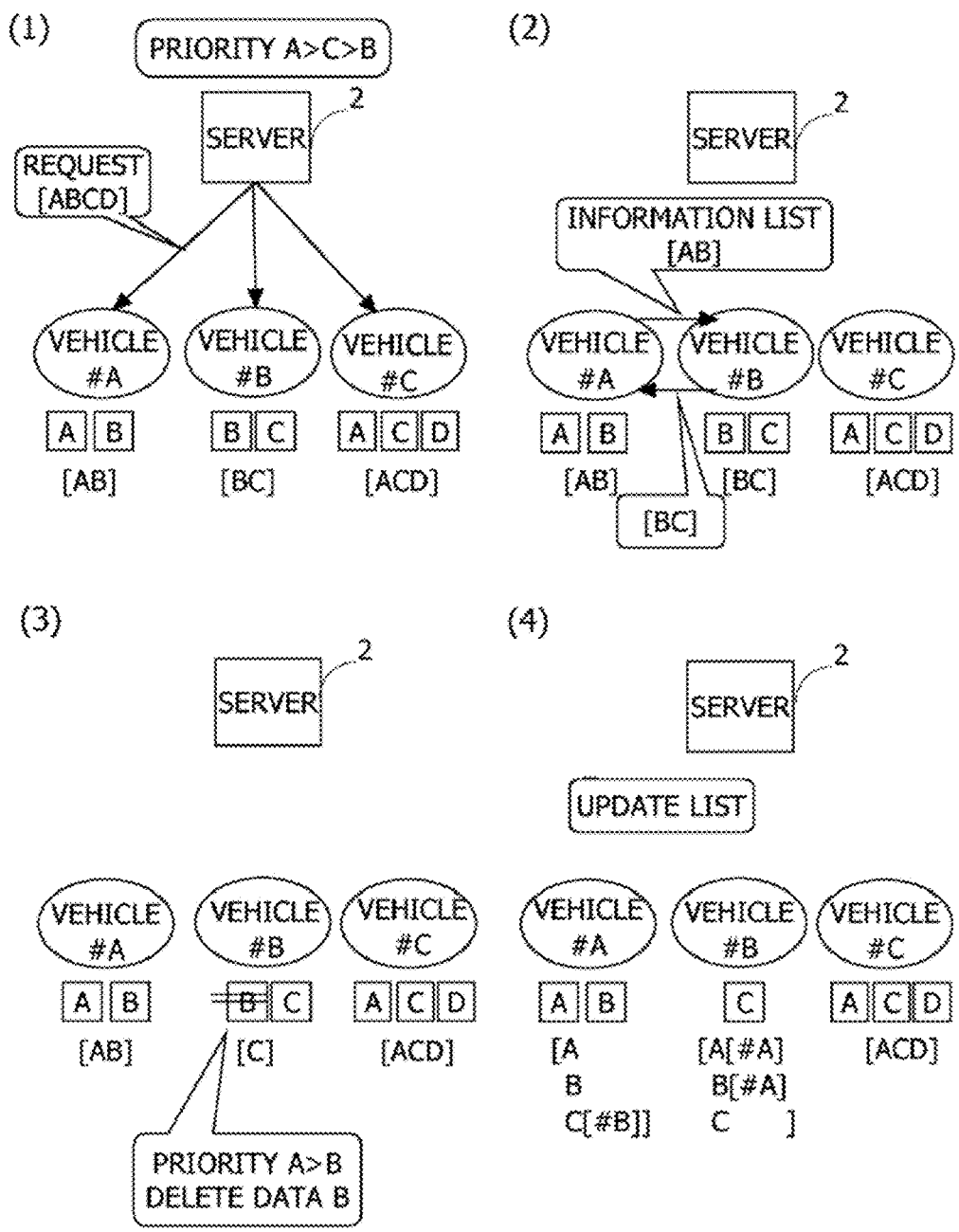
FIG. 11A is a diagram illustrating an example of information collection processing in a data collection system according to the second modification.
Figure 11B:
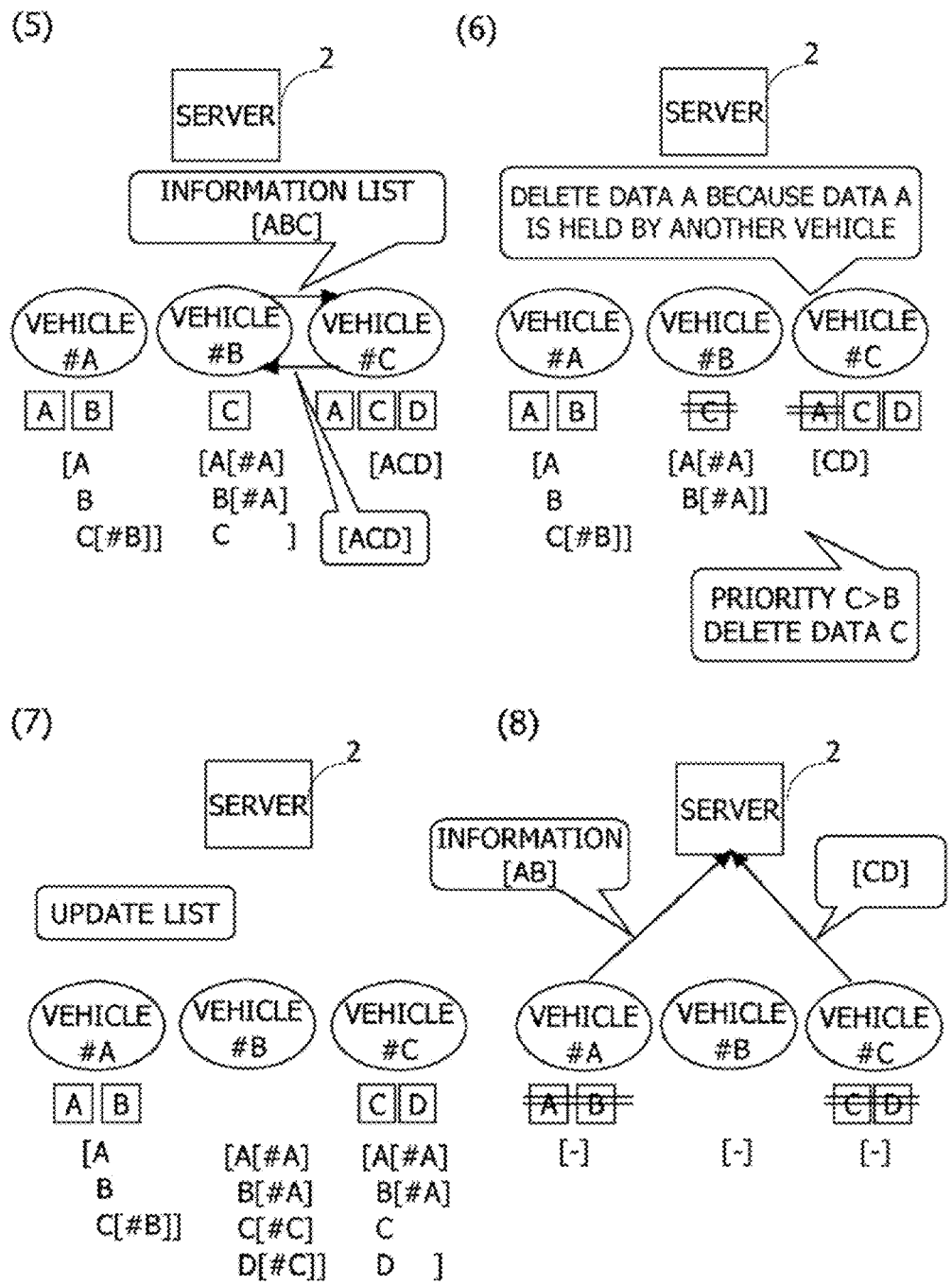
FIG. 11B is a diagram illustrating an example of information collection processing in a data collection system according to the second modification.

FIGS. 11A and 11B are diagrams illustrating an example of information collection processing in a data collection system 100 according to the second modification. In FIGS. 11A and 11B, premises similar to those in FIGS. 7A and 7B are assumed. However, in FIGS. 11A and 11B, it is assumed that the priority order is vehicle #A>vehicle #C>vehicle #B. In FIGS. 11A and 11B, a transmission condition is that the priority order is higher.

(1) First, the server 2 issues an information request to vehicles 10. Vehicle #A, vehicle #B and vehicle #C each receive the information request from the server 2 (OP101 in FIG. 8). In (1) of FIG. 11A, the information request from the server 2 includes information pieces A, B, C, D as objects to be collected.

(2) Upon vehicle #A and vehicle #B approaching each other and a distance between vehicle #A and vehicle #E thus becoming a distance that enables inter-vehicle communication, vehicle #A and vehicle #B detect each other and exchange information lists 15 with each other (OP104 in FIG. 8).

(3) In vehicle #B, information piece B is included in the information list 15 and the received list from vehicle #A (OP401: YES in FIG. 9), no device ID is attached in each or both lists (OP402: NO and OP403: NO in FIG. 9) and the priority order of vehicle #B is lower than that of vehicle #A (OP404: NO in FIG. 9), and thus, vehicle #B makes a determination not to transmit information piece B to the server 2 (OP407 in FIG. 9) and deletes information piece B (OP408 in FIG. 9). Also, in vehicle #B, as a result of the deletion of information piece B, information ID of information piece B is also deleted from the information list 15 and the information list 15 is thereby updated (OP409 in FIG. 9).

Meanwhile, in vehicle #A, information piece B is included in the information list 15 and the received list from vehicle #B (OP401: YES in FIG. 9), no device ID is attached in each of both lists (OP402: NO and OP403: NO in FIG. 9) and the priority order of vehicle #A is higher than that of vehicle #B (OP404: YES in FIG. 9), and thus, the vehicle #A makes a determination to transmit information piece B to the server 2 (OP406 in FIG. 9).

(4) Vehicle #A and vehicle #B update the respective information lists 15 (OP302 in FIG. 8). Since no information ID of information piece C is included in the own information list (OP501: NO in FIG. 10) and no device ID is attached in the received list from vehicle #B (OP502: NO in FIG. 10), vehicle #A adds information ID: C and device ID; #B to the information list 15 in association with each other (OP503 in FIG. 10). In FIG. 11A, association between an information ID and a device ID in an information list 15 is indicated as "information ID [device ID]". Accordingly, the information list of vehicle #A is [A, B, C[#B]].

Since no information IDs of information pieces A, B are included in the relevant information list (OP501: NO in FIG. 10) and no device ID is attached in the received list from vehicle #A (OP502: NO in FIG. 10), vehicle #B adds information ID: A and device ID: #A, and information ID: B and device ID: #A to the information list 15 in association with each other, respectively (OP503 in FIG. 10). Consequently, the information list of vehicle #B is [A[#A], B[#A], C].

(5) of FIG. 11B Next, upon a distance between vehicle #B and vehicle #C becoming a distance that enables inter-vehicle communication, vehicle #B and vehicle #C detect each other and exchange information lists 15 with each other (OP104 in FIG. 8).

(6) In vehicle #B, information piece C is included in both the own information list 15 and the received list from vehicle #C (OP401; YES in FIG. 9), no device ID is attached in both lists (OP402: NO, OP403: NO in FIG. 9) and vehicle #B has a priority order that is lower than that of vehicle #C (OP404: NO in FIG. 9), and thus, vehicle #B makes a determination not to transmit information piece C to the server 2 (OP407 in FIG. 9) and deletes information piece C from an information storage unit 16 (OP408 in FIG. 9). Also, in vehicle #B, as a result of the deletion of information piece C, the information ID of information piece C is deleted from the information list 15 and the information list 15 is thereby updated (OP409 in FIG. 9).

On the other hand, in vehicle #C, information piece A is included in both the own information list 15 and the received list from vehicle #B (OP401: YES in FIG. 9), no device ID is attached in the information list 15 (OP402: NO in FIG. 9) and device ID: #A is attached in the received list from vehicle #B (OP403; YES and OP405: NO in FIG. 9), and thus, vehicle #C makes a determination not to transmit information piece A to the server 2 (OP407 in FIG. 9) and deletes information piece A from an information storage unit 16 (OP408 in FIG. 9). Also, in vehicle #C, as a result of the deletion of information piece A, the information ID of information piece A is deleted from the information list 15 and the information list 15 is thereby updated in FIG. 9).

(7) Vehicle #B and vehicle #C update the respective information lists 15 (OP302 in FIG. 8). Since in vehicle #B, information IDs of information pieces C, D are not included in the own information list 15 (OP501: NO in FIG. 10) and no device ID is attached in the received list from vehicle #C (OP502: NO in FIG. 10), vehicle #B adds the information IDs of information pieces C, D to the information list 15 in association with device ID: #C (OP503 in FIG. 10). Consequently, the information list 15 of vehicle #B is [A[#A], B[#A], C[#C], D[#C]].

On the other hand, since in vehicle #C, the information IDs of information pieces A, B are not included in the own information list 15 (OP501: NO in FIG. 10) and device ID: #A is attached in the received list from vehicle #B (OP502: YES in FIG. 10), vehicle #C adds the association between the information IDs of the information pieces A, B and device ID: #A to the information list 15 as it is (OP504 in FIG. 10). Consequently, the information list 15 of vehicle #C is [A[#A], B[#A], C, D].

(8) Upon an end of a response waiting period, vehicle #A, vehicle #B and vehicle #C transmit respective information pieces held by vehicle #A, vehicle #B and vehicle #C and provided with the IDs included in a request list to the server 2 (OP109: YES and OP110 in FIG. 8). Since vehicle #A holds information pieces A, B, vehicle #A transmits information pieces A, B to the server 2. Since vehicle #C holds information pieces C, D, vehicle #C transmits information piece C, D to the server 2. Upon an end of the transmission of the information pieces to the server 2, vehicle #A, vehicle #B and vehicle #C delete the respective information pieces that have been transmitted to the server 2 from the respective memory units and delete the IDs of the transmitted information pieces and the IDs included in the request list from the respective information lists 15 (OP111 in FIG. 8). As a result, in FIG. 11B, each of the respective information lists 15 of vehicle #A, vehicle #B and vehicle #C becomes blank.

In (8) of FIG. 11B, the respective single information pieces A, B, C, D are transmitted to the server 2 and redundant transmission is thus avoided. Therefore, the second modification also enables suppression of transmission of redundant information to the server 2.

For example, although an information piece in a received list from another data communication device 1 is reflected in the information list 15, if it is not specified that the information piece is an information piece held by any of the other data communication devices 1, in (6) of FIG. 11B, information piece A is not deleted from vehicle #C. Also, in this case, in (6) of FIG. 11B, information piece A is transmitted from each of vehicle #A and vehicle #C to the server 2. In other words, reflecting information in the received list from the other data communication device 1 in the information list 15 and specifying that the information is held by any of the other data communication devices 1 enables enhancement in speed of removal of information held by and redundant between data communication devices 1.

Also, in the second modification, as a method of specifying that, information is information held by any of other data communication devices 1 in the information list 15, a device ID is registered in association with an information ID. If a device ID of another data communication device 1 is attached to an information ID in a received list, the information ID matching an information ID of information held by the data communication device itself, the data communication device 1 deletes the information of the information ID from the data communication device itself (for example, operation of vehicle #C in (6) in FIG. 11B). On the other hand, if a device ID of the data communication device itself is attached to an information ID in a received list, the information ID matching an information ID of information held by the data communication device itself, the data communication device 1 does not delete information of the information ID from the data communication device itself.

For example, after (1) in FIG. 113, even where exchange of information lists 15 between vehicle #A and vehicle #C occurs, in the information list 15 of vehicle #C, the device ID of vehicle #A is attached to the information IDs of information pieces A, B, and thus information pieces A, B are not deleted from vehicle #A.

If a received list from another data communication device 1 specifies that information held by a data communication device 1 is held by the data communication device 1 and a loop of the information thus occurs, the information can be prevented from being deleted from the data communication device 1 and thus removed from the data collection system 100.

Here, in (8) of FIG. 11B, the information list 15 of vehicle #A includes association between the information ID of information piece C and the device ID of vehicle #B and in reality, information piece C has been deleted from vehicle #B, but vehicle #A recognizes that information piece C is held by any of other data communication devices 1, and thus there is no specific effect on reduction of transmission of redundant information to the server 2.

Also, if after (7) of FIG. 11B, vehicle #A and vehicle #C exchange the respective information lists 15, information piece C is deleted from vehicle IC (OP405: NO and OP406 in FIG. 9). However, in reality, a huge amount of information is collected in the server 2 and thus, even if a part of information is missing, an effect of the missed part on processing performed based on the collected information (for example, statistical processing or the like) is small, but rather, an effect obtained by reduction of transmission of redundant information to the server 2 is outweighed.

Note that although in the second modification, an information list 15 includes an ID of an information pieces held by the relevant data communication device 1 itself and an ID of an information piece held by any of other data communication devices 1, these information pieces may be held in separate lists.

<Others>

Each of the embodiment and modifications above has been described in terms of the case where data communication devices 1 are employed as devices that are mounted on vehicles 10 and generate information to be collected. However, the present disclosure is not limited to this case, and for example, general-purpose mobile devices, such as smartphones, that are mounted on vehicles 10 and include an application for the data collection system 100 installed therein can be employed as devices that generate information to be collected in the data collection system 100. Therefore, "in-vehicle device" is not limited to a data communication device 1 and for example, may be a mobile terminal, for example, a car navigation device or a smartphone.

Also, as the server 2, a data communication device 1 mounted on a vehicle may be employed. However, where a data communication device 1 operates as the server 2, for example, the data communication device 1 may perform processing for receiving information from a passing vehicle 10 by means of inter-vehicle communication and the processing in any of the embodiment and the modifications described above.

Instead of a list (request list) including IDs for information pieces requested and subject to data collection, a list of IDs of information pieces excluded from the subject of data collection may be transmitted together with an information request from the server 2. Also, instead of an ID list, for example, information having an attribute that is subject of data collection or is excluded from the subject of data collection may be transmitted together with an information request from the server 2. Alternatively, a Bloom filter created from the information on the attribute of information that is the subject of data collection or is excluded from the subject of data collection may be transmitted together with the information request from the server 2 and a data communication device 1 may filter information held in an information storage unit 16 using the received Bloom filter and transmit the resulting information to the server 2.

Also, in each of the embodiment and modifications described above, if information redundant with information held by another data communication device 1 as a result of exchange of information lists 15 is deleted from a data communication device 1, the information is deleted from an external storage device 104 (information storage unit 16), but instead of this case, a flag for preventing transmission of the information may be set without deleting the information from the external storage device 104. Alternatively, for example, for each of information pieces held in the information storage unit 16, a control unit 14 may record the number of determinations to delete the information piece and after the number of determination for deletion reaching a predetermined count, delete the information piece from the information storage unit 16. Here, an upper limit for the number of determinations for deletion may be, for example, set in advance or designated together with an information request from the server 2.

Also, in each of the embodiment and modifications described above, a data communication device 1 receives a response waiting period together with an information request from the server 2 and during the response waiting period, no information is transmitted to the server 2, but instead of this case, for example, where a low-cost wireless network such as WiFi is available, information may be transmitted without waiting for a lapse of the response waiting period. Also, the response waiting period may be set for each of wireless network types in such a manner that, for example, the response waiting period is set to be shorter as the wireless network is lower in communication cost.

Also, in each of the embodiment and modifications described above, it has been described that upon reception of an information request from the server 2, each data communication device 1 starts an exchange of information lists 15 with another data communication device 1, redundant information is removed and requested information is transmitted to the server 2. However, a trigger for a start of the above processing in the data communication device 1 is not limited to that of the above case. For example, a data communication device 1 may exchange information lists 15 with another data communication device 1 and delete redundant information consistently or during a predetermined period of time in a predetermined period. Also, a timing for transmission of information to the server 2 may be a timing of reception of an information request from the server 2 or may be a timing in a preset period.

Also, in each of the embodiment and modifications described above, a data communication device 1 deletes information that has been transmitted to the server 2, from an own external storage device 104, but the present disclosure is not limited to this case and for example, a flag for preventing transmission of the information may be set without deleting the information from the external storage device 104.

Also, in each of the embodiment and modifications described above, a data communication device 1 exchanges an entirety of an information list 15 in exchange of information lists 15, but the present disclosure is not limited to this example and for example, a data communication device 1 may exchange a part of an information list 15, the part corresponding to a request list.

<Recording Medium>

A program that causes a computer or another machine or device (hereinafter, a computer or the like) to implement the processing by the data communication device 1 described above can be recorded in a computer-or the like-readable recording medium. By causing a computer or the like to read and execute the program in the recording medium, the computer functions as the data communication device 1 described above.

Here, the recording medium that can be read by the computer or the like: refers to a non-transitory recording medium that can store information such as data and/or programs by means of electrical, magnetic, optical, mechanical or chemical action and can be read from the computer or the like. From among such recording mediums, ones that can be removed from the computer or the like include, for example, a flexible disk, a magnetooptical disk, a CD-ROM, a CD-R/W, DVD, a Blu-ray disk, a DAT, an 8 mm tape and a memory card such as a flash memory. Also, recording mediums fixed to the computer or the like include, e.g., a hard disk and a ROM (read-only memory). Furthermore, an SSD (solid state drive) can be used as either a recording medium that can be removed from the computer or the like or a recording medium fixed to the computer or the like.

What is claimed is:

1. An in-vehicle device comprising:
a first communicator configured for communication with other in-vehicle devices;
a second communicator configured for communication with a predetermined transmission destination;
a storage that stores:
a plurality of information pieces, and
a list including information that identifies the plurality of information pieces, respectively; and
a controller configured to:
perform transmission processing for transmitting at least a part of the plurality of information pieces stored in the storage to the predetermined transmission destination,
transmit the list to a first in-vehicle device of the other in-vehicle devices and receive, from the first in-vehicle device through the first communicator, a first list including information that identifies information pieces each held by any of the other in-vehicle devices including the first in-vehicle device, and
determine, when a first information piece is present in the storage, whether or not to transmit the first information piece in the transmission processing, depending on whether or not a predetermined condition is met, wherein information that identifies the first information piece is included in both the first list and the list.

2. The in-vehicle device according to claim 1, wherein when the controller makes a determination not to transmit the first information piece in the transmission processing, the controller is configured to delete the first information piece from the storage.

3. The in-vehicle device according to claim 1, wherein the controller is configured to add first information that identifies information pieces to the list to update the list, and
the first information is not included in the list but included in the first list.

4. The in-vehicle device according to claim 3, wherein the controller is configured to:
in the update of the list, update the list with a vehicle information piece associated with the first information, the vehicle information piece indicating that an information piece corresponding to the first information is held by any of the other in-vehicle devices; and
when a second list received from a second in-vehicle device of the other in-vehicle devices includes second information associated with an additional information piece that identifies the additional information piece, make a determination not to transmit an information piece of the information pieces stored in the storage in the transmission processing, the second list including respective identification information of information pieces each held by any of the other in-vehicle devices including the second in-vehicle device, and an identification information of the information piece matching the second information.

5. The in-vehicle device according to claim 4, wherein each of the vehicle information pieces is an identification information of an in-vehicle device; and
the controller is configured to, when the second information included in the second list is received from the second in-vehicle device and the vehicle information piece associated with the second information indicates an identification information of the in-vehicle device itself, make a determination to transmit an information of the information pieces stored in the storage, an identification information of the information piece matching the second information, in the transmission processing.

6. An information processing method comprising causing an in-vehicle device configured to perform transmission processing for transmitting at least a part of a plurality of information pieces stored in a storage to a predetermined transmission destination to:
transmit a list including information that identifies the plurality of information pieces, respectively, to a first in-vehicle device of other in-vehicle devices;
receive a first list including information that identifies information pieces each held by any of the other in-vehicle devices including the first in-vehicle device from the first in-vehicle device, through a first communicator used for transmission with the other in-vehicle devices; and
when a first information piece is present in the storage, determine whether or not to transmit the first information piece in the transmission processing depending on whether or not a predetermined condition is met, wherein information that identifies the first information piece is included in both the first list and the list.

7. A non-transitory computer-readable medium recorded with an information processing program for causing a computer to:
perform transmission processing for transmitting at least a part of a plurality of information pieces stored in a storage to a predetermined transmission destination;
transmit a list including information that identifies the plurality of information pieces, respectively, to a first in-vehicle device of other in-vehicle devices;
receive a first list including information that identifies information pieces each held by any of the other in-vehicle devices including the first in-vehicle device from the first in-vehicle device, through a first communicator used for transmission with the other in-vehicle devices; and
when a first information piece is present in the storage, determine whether or not to transmit the first information piece in the transmission processing depending on whether or not a predetermined condition is met, wherein information that identifies the first information piece is included in both the first list and the list.

8. The in-vehicle device according to claim 3, wherein the first information corresponds to information pieces that the controller determines not to transmit, and the controller controls the information pieces to be deleted from the storage.

9. The information processing method according to claim 6, further comprising causing the in-vehicle device to:
determine not to transmit the first information piece in the transmission processing, and delete the first information piece from the storage.

10. The information processing method according to claim 6, further comprising causing the in-vehicle device to:
add first information that identifies information pieces to the list to update the list,
wherein the first information is not included in the list but included in the first list.

11. The information processing method according to claim 10, wherein the first information corresponds to information pieces that are not transmitted, and the information pieces are deleted from the storage.

12. The information processing method according to claim 10, wherein
the adding comprises updating the list with a vehicle information piece associated with the first information, the vehicle information piece indicating that an information piece corresponding to the first information is held by any of the other in-vehicle devices; and the information processing method further comprises causing the in-vehicle device to:
receive a second list from a second in-vehicle device of the other in-vehicle devices that includes second information associated with an additional information piece that identifies the additional information piece; and
determine not to transmit an information of the information pieces stored in the storage in the transmission processing, the second list including respective identification information of information pieces each held by any of the other in-vehicle devices including the second in-vehicle device, and an identification information of the information piece matching the second information.

13. The information processing method according to claim 12, wherein
each of the vehicle information pieces is an identification information of an in-vehicle device; and
when the second information included in the second list is received from the second in-vehicle device and the vehicle information piece associated with the second information indicates an identification information of the in-vehicle device itself, the in-vehicle device determines to transmit an information of the information pieces stored in the storage, an identification information of the information piece matching the second information, in the transmission processing.

14. The non-transitory computer-readable medium according to claim 7, the information processing program further causing the computer to:
determine not to transmit the first information piece in the transmission processing, and delete the first information piece from the storage.

15. The non-transitory computer-readable medium according to claim 7, the information processing program further causing the computer to:
add first information that identifies information pieces to the list to update the list,
wherein the first information is not included in the list but included in the first list.

16. The non-transitory computer-readable medium according to claim 15, wherein the first information corresponds to information pieces that are not transmitted, and the information processing program causes the computer to delete the information pieces from the storage.

17. The non-transitory computer-readable medium according to claim 15, wherein
the adding comprises updating the list with a vehicle information piece associated with the first information, the vehicle information piece indicating that an information piece corresponding to the first information is held by any of the other in-vehicle devices; and
the information processing program further causes the computer to:
receive a second list from a second in-vehicle device of the other in-vehicle devices that includes second information associated with an additional information piece that identifies the additional information piece; and
determine not to transmit an information of the information pieces stored in the storage in the transmission processing, the second list including respective identification information of information pieces each held by any of the other in-vehicle devices including the second in-vehicle device, and an identification information of the information piece matching the second information.

18. The non-transitory computer-readable medium according to claim 17, wherein
each of the vehicle information pieces is an identification information of an in-vehicle device; and
when the second information included in the second list is received from the second in-vehicle device and the vehicle information piece associated with the second information indicates an identification information of the in-vehicle device itself, the information processing program causes the computer to determine to transmit an information of the information pieces stored in the storage, an identification information of the information piece matching the second information, in the transmission processing.

* * * * *